United States Patent
Chowdhury et al.

(10) Patent No.: US 8,630,645 B2
(45) Date of Patent: Jan. 14, 2014

(54) FAST HANDOFF SUPPORT FOR WIRELESS NETWORKS

(75) Inventors: Kuntal Chowdhury, Plano, TX (US); Janakiraman Senthilnathan, Nashua, NH (US); Sanil Kumar Puthiyandyil, Nashua, NH (US); Shaji E. Radhakrishnan, Nashua, NH (US); Mruthyunjaya Navali, Westford, MA (US); Leonard Schwartz, North Andover, MA (US)

(73) Assignee: Cisco Technology, Inc., San Jose, CA (US)

(*) Notice: Subject to any disclaimer, the term of this patent is extended or adjusted under 35 U.S.C. 154(b) by 967 days.

(21) Appl. No.: 11/704,652

(22) Filed: Feb. 9, 2007

(65) Prior Publication Data

US 2007/0254661 A1 Nov. 1, 2007

Related U.S. Application Data

(60) Provisional application No. 60/771,991, filed on Feb. 9, 2006.

(51) Int. Cl.
*H04W 36/00* (2009.01)

(52) U.S. Cl.
USPC ........... 455/436; 455/437; 455/438; 455/439; 455/440; 455/441; 455/442; 370/331; 370/332; 370/333; 370/334

(58) Field of Classification Search
USPC .................. 455/436–441, 442; 370/331–334
See application file for complete search history.

(56) References Cited

U.S. PATENT DOCUMENTS

| | | | |
|---|---|---|---|
| 6,522,880 B1 * | 2/2003 | Verma et al. ................. | 455/436 |
| 6,769,000 B1 | 7/2004 | Akhtar et al. | |
| 6,954,790 B2 | 10/2005 | Forslow et al. | |
| 6,959,190 B2 | 10/2005 | Choi et al. | |
| 6,985,464 B2 | 1/2006 | Harper et al. | |
| 7,372,826 B2 | 5/2008 | Dahod et al. | |
| 7,493,084 B2 * | 2/2009 | Meier et al. ................. | 455/41.2 |

(Continued)

FOREIGN PATENT DOCUMENTS

| | | |
|---|---|---|
| CN | 1596023 A | 3/2005 |
| WO | WO-0054523 A1 | 9/2000 |

OTHER PUBLICATIONS

International Search Report and Written Opinion issued for corresponding International Patent Application No. PCT/US2007/003566.
U.S. Appl. No. 61/230,031, filed Jul. 30, 2009.

(Continued)

*Primary Examiner* — Patrick Edouard
*Assistant Examiner* — Shantell L Heiber
(74) *Attorney, Agent, or Firm* — Wilmer Cutler Pickering Hale and Dorr LLP

(57) ABSTRACT

Systems and methods for providing fast handoff support by transferring information are provided. Additionally, a generic protocol message format is presented which allows the transfer of information used in the handoff. The generic protocol allows a gateway to request contexts or session information and send information that allows tunnel setup and mapping to other connections. The session, tunnel, and mapping information allow the gateways to switch packet processing operations without causing disruption to the packet flow. Further, in inter-gateway handoffs or inter-access network handoffs, fast and seamless handoffs are provided so the mobile station keeps the same IP address and the session continues.

20 Claims, 14 Drawing Sheets

(56) References Cited

U.S. PATENT DOCUMENTS

| | | | |
|---|---|---|---|
| 2002/0045450 A1* | 4/2002 | Shimizu et al. | 455/442 |
| 2003/0021252 A1* | 1/2003 | Harper et al. | 370/338 |
| 2003/0053429 A1 | 3/2003 | Choi et al. | |
| 2003/0054823 A1 | 3/2003 | Choi et al. | |
| 2003/0104814 A1* | 6/2003 | Gwon et al. | 455/436 |
| 2003/0204599 A1 | 10/2003 | Trossen et al. | |
| 2003/0227911 A1* | 12/2003 | Trossen | 370/352 |
| 2004/0018841 A1* | 1/2004 | Trossen | 455/436 |
| 2004/0081086 A1* | 4/2004 | Hippelainen et al. | 370/227 |
| 2004/0097232 A1* | 5/2004 | Haverinen | 455/436 |
| 2005/0025132 A1 | 2/2005 | Harper et al. | |
| 2005/0198337 A1 | 9/2005 | Sun et al. | |
| 2005/0265360 A1* | 12/2005 | Kim et al. | 370/400 |
| 2006/0018280 A1* | 1/2006 | Kumar et al. | 370/331 |
| 2006/0031924 A1* | 2/2006 | Kwon et al. | 726/2 |
| 2007/0189255 A1 | 8/2007 | Navali et al. | |
| 2008/0205342 A1 | 8/2008 | Radhakrishnan et al. | |
| 2009/0086742 A1 | 4/2009 | Ghai et al. | |
| 2009/0156213 A1 | 6/2009 | Spinelli et al. | |

OTHER PUBLICATIONS

U.S. Appl. No. 60/758,343, filed Jan. 11, 2006.

* cited by examiner

FAST HANDOFF SUPPORT FOR WIRELESS NETWORKS

CROSS-REFERENCE TO RELATED APPLICATIONS

This application claims benefit of U.S. Provisional Patent Application No. 60/771,991, filed Feb. 9, 2006, which is hereby incorporated by reference herein in its entirety.

TECHNICAL FIELD OF THE DISCLOSURE

The present invention relates to supporting mobile station handoffs in a wireless network. More specifically, the invention relates to a system and method for supporting handoffs in a wireless network by transferring information to assist in the handoff.

BACKGROUND OF THE DISCLOSURE

The idea of managing mobility of a wireless device or mobile station on a network has been around for some time. Allowing a mobile station (MS) such as a cell phone or a personal digital assistant (PDA) to roam on the wireless network requires managing various equipment. When a mobile station passes from one radio tower to another radio tower, the mobile station can pass into areas of the network controlled by different equipment, such as a packet data serving node (PDSN) and require a handoff.

With the advent of Internet Protocol (IP), networks began sending data in packets and using an IP address to route the data to its final destination. In time, wireless networks started to become data capable and would assign an IP address to a mobile station for the purpose of sending data to the mobile station. Generally, interconnection between devices is standardized to a certain degree based on the International Organization for Standardization (ISO)'s definition of a model for Open Systems Interconnection (OSI). OSI is used to define modes of interconnection between different components in networking systems and uses a seven layer model to do so.

Among the seven layers, Layer 3 (L3) is the network layer which is concerned with the delivery of packets of data. This layer defines the address structure of the network and how packets should be routed between end systems. IP and Internet Packet Exchange (IPX) are examples of network layer protocols. Layer 2 (L2) is the data link layer which also defines a lower level addressing structure for use between end systems as well as a lower level framing and checksums which are used to transmit data onto the physical medium. Ethernet, Token Ring, and Frame Relay are examples of data link layer or L2 protocols. Typically, L2 switching is implemented along side L3 routing for local area networks to facilitate communication between devices in a common IP subnet. However, in a wireless network where a mobile station can roam among base stations handoffs can pose a problem in terms of security and continuity of data flow.

Mobile IP was introduced to allow a mobile station to keep the same IP address regardless of where the mobile station travels. When the mobile station is at home, it is on the home network, or the network that it is typically associated with. The router connected to the home network is the home agent. When the mobile station is away from the home network, it associates with a foreign network and communicates through a foreign agent. In the event that packets are sent to a mobile station, the packets first travel to the home network. If the mobile station is not residing in the home network the packets are forwarded to the foreign agent with which the mobile station is registered. The packets are delivered to the mobile station from the foreign agent.

In a wireless IP network, an active session on a MS may incur inter-PDSN handoffs as the MS roams around the network. This may cause service disruption since re-negotiation of L2 and L3 protocols will occur between the mobile station and the network. Therefore, it would be desirable to mitigate these service disruptions during inter-PDSN handoffs of active sessions.

SUMMARY OF THE DISCLOSURE

Systems and methods are provided for transferring information to assist in a handoff between gateways. A generic protocol message format is disclosed that provides for the transfer of many kinds of information used in an inter-gateway or inter-access network handoff. The generic protocol allows a gateway to request session information or context information and send other information that allows the setup of tunnels. The context, tunnel, and mapping information allow the gateways to switch packet processing operations from one gateway to another gateway without causing disruption to the packet flow. The first gateway can communicate with a second gateway handling the session and request the session information used to provide the session and to setup one or more tunnels that are mapped to the connections with the access network. The second gateway can begin forwarding unprocessed packets over the tunnels for transmission to the access network. When the context information is installed, the gateways can switch processing roles, while providing an uninterrupted session to the user or mobile station.

Certain embodiments feature a wireless communication system including a serving gateway; a home agent in communication with the serving gateway; a target gateway that receives a registration request and communicates a handoff request including user specific type-length-value (TLV) attribute requests to the serving gateway; the serving gateway communicating a handoff response including the requested TLVs and initiating a packet flow between the gateways; and the home agent switching communication to the target gateway.

Some embodiments feature a method including receiving a serving gateway address at a target gateway; sending a handoff request including TLVs to the serving gateway; receiving a handoff response including TLVs at the target gateway; initializing TLV context information received in the handoff response; and sending a message from the target gateway to a home agent to switch a tunnel from the serving gateway to the target gateway.

Certain embodiments feature a wireless communication system comprising a serving access network; a target access network in communication with the serving AN, and that communicates a handoff request including TLV requests to the serving access network; the serving access network communicating a handoff response including the requested TLVs and initiating a packet flow between the serving access network and the target access network; the target access network installing the contexts received from the serving access network and processing packets; and a home agent switching communication to the target access network.

DETAILED DESCRIPTION OF THE DISCLOSURE

Systems and methods are provided for supporting handoffs in a wireless network by transferring information to assist in the handoff. A generic protocol message format is presented which allows the transfer of information used in the handoff. The generic protocol allows a gateway to request session information or context information and send other information that allows tunnel setup and mapping the tunnel(s) to other connections. The context, tunnel, and mapping information allow the gateways to switch packet processing operations without causing disruption to the packet flow. When a handoff is detected, an access network can contact a gateway to setup for the handoff. The gateway can communicate with the gateway handling the session and request the session information needed to handle the session and to setup one or more tunnels that are mapped to other connections. The gateway handling the session can begin forwarding unprocessed packets over the tunnels for sending to the access network. When the context information is installed, the gateways can switch processing roles, while providing an uninterrupted session to the user.

Figure 1:
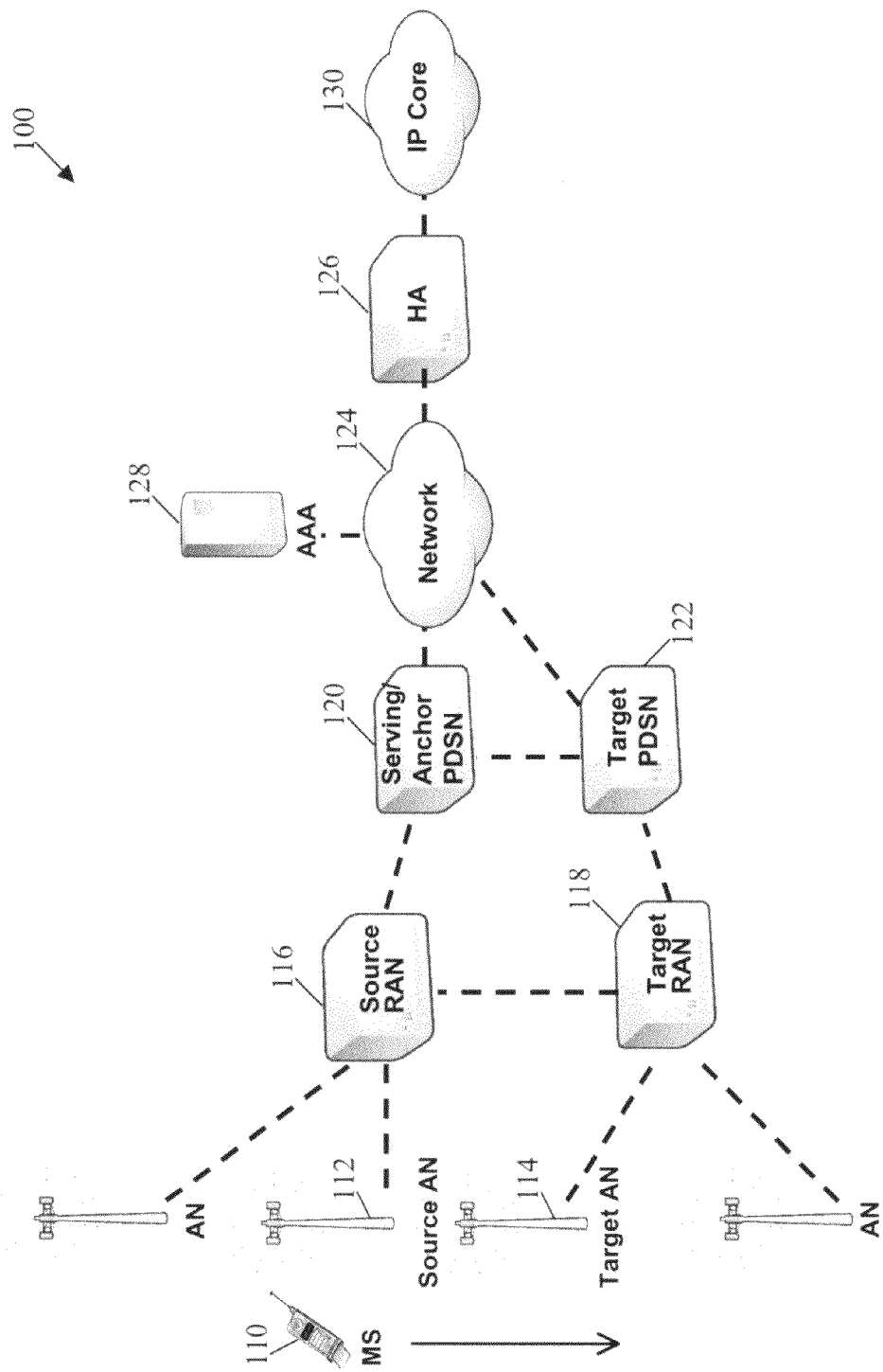
FIG. 1 is a schematic representation of portions of a wireless data network used to deliver data to a Mobile station in accordance with certain embodiments of the invention.

FIG. 1 illustrates a wireless network 100 topology in accordance with certain embodiments of the present invention. Wireless network 100 includes a mobile station (MS) 110, a source access network (AN) 112, a target AN 114, a source radio access network (RAN) 116, a target RAN 118, an anchor packet data serving node (PDSN) 120, a Target PDSN (T-PDSN) 122, a network 124, a home agent (HA) 126, an Authentication, Authorization, and Accounting (AAA) server 128, and an IP core 130. As may be appreciated by one skilled in the field, routers, servers, and other pieces of networking and communication equipment may also be included in wireless data network 100 depending on the embodiment.

In wireless network 100, mobile station 110 communicates with the network wirelessly through an access network such as AN 112, which transmits data to and receives data from mobile station 110. AN 112 receives data from source RAN 116, which converts data into radio wave spectrum suitable for wireless transmission by an AN and converts received radio wave spectrum information into data for forwarding to equipment such as Serving/Anchor PDSN 120. Source RAN 116 is coupled to network 124. As shown, network 124 are coupled to Home Agent 126 and Home Agent 126 is coupled to IP Core 130. Network 124 can be used to forward data relating to such functions as authentication, authorization, accounting, and security for transmissions involving mobile station 110.

In some embodiments, both Network 124 are implemented on the same network, such as the Internet or any other packet switched network. Devices such as AAA 128 are responsible for the authentication, authorization, accounting, key distribution, and other switching functionalities for wireless network 100. Network 124 can provide data transmission to a mobile station that is not located in its respective Home Network (not shown) by forwarding data from Home Agent 126 to Serving/Anchor PDSN 120 for further transmission to mobile station 110. Home Agent 126 also receives data from IP Core 134 which can include the Internet, content servers, email servers, connections to other mobile stations, and any other suitable source or destination for data.

In operation, an inter-PDSN handoff occurs when MS 110 moves from Source AN 112 to Target AN 114. As shown in FIG. 1, this handoff involves MS 110 changing from source RAN 116 and Anchor PDSN 120 to target RAN 118 and Target PDSN 122. The operational aspects of some embodiments of the invention are illustrated in FIG. 2.

Figure 2:
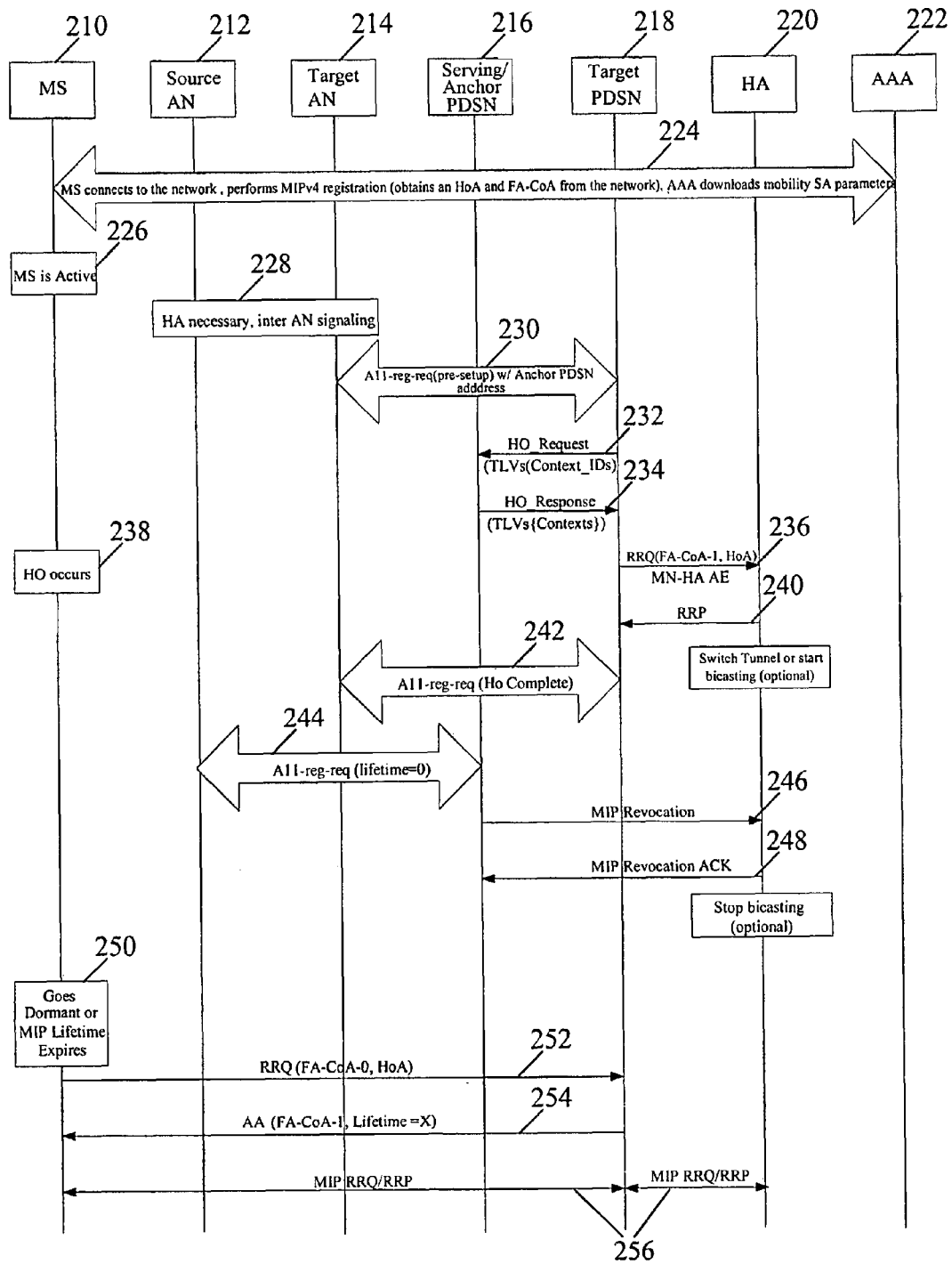
FIG. 2 is schematic representation of a signaling diagram for a handoff in accordance with certain embodiments of the invention.

FIG. 2 illustrates an inter-PDSN handoff with Mobile IPv4 in accordance with certain embodiments of the invention. The network devices involved in this handoff include MS 210, Source AN 212, a Target AN 214, a Serving/Anchor PDSN 216, a Target PDSN 218, a HA 220, and an AAA 222.

In 224, MS 210 connects to the wireless network and performs Mobile IP registration with the Serving/Anchor PDSN 216. Serving/Anchor PDSN 216 may have a foreign agent care-of address (FA-CoA-0) or it may acquire this address from the wireless network. A Home Address (HoA) is also acquired from HA 220 by Serving/Anchor PDSN 216. In this step, AAA 222, which may be located in the home network (not shown), also sends MS-HA keying material to the Anchor PDSN 216 for caching. The MS-HA keying material can be used by the wireless network for security purposes. In 226, MS 210 initiates an application, such as an email request or a phone call, starting a session, which remains active.

In 228, Source AN 212 detects that MS 210 requires a handoff to Target AN 214. Inter-AN signaling takes place between Source AN 212 and Target AN 214 to transfer information about the active session. The information transfer can take place through an A15 interface, which carries signaling information between ANs when inter-AN paging is used; or an A13 interface can be used for transferring the information. In 230, Target AN 214 determines that Anchor PDSN 216 is unreachable from network link 134 of FIG. 1. Target AN 214 selects Target PDSN 218 and sends an A11-reg-request interface message to "Pre-Setup" the A10 interface link(s) for the incoming handoff session. In this step, Target AN 218 also includes Anchor PDSN information (IP address) for Target PDSN 218.

In 232, Target PDSN 218 sends an A11-HO-Request message, which can request a handoff or information for a handoff, to Anchor PDSN 216. A default port can be used, such as 699, which is the same port used for A11 interface signaling. Based on the capability of Target PDSN 218, the A11-HO-Request message includes a list of Context_IDs for the contexts that PDSN 218 requests Anchor PDSN 216 to transfer. In some embodiments, the Context_ID list is modified by Target PDSN 218 or other information is also requested. The list of Context_IDs is defined below for certain embodiments. The A11-HO-Request message is formatted as per ISO specification (A11 message format) with the Normal Vendor Specific Extension (NVSE) carrying Context Id information.

In 234, Anchor PDSN 216 responds back to the Target PDSN 218 with a A11-HO-Response message addressed to the destination port from where the Request message was sent from, for example, port 699. In the A11-HO-Response message, Anchor PDSN 216 includes the requested Context information, if available. Also, the Anchor PDSN 216 includes the MN-HA keying material that it received in 224. Anchor PDSN 216 may optionally encrypt the context data in this message for additional protection in some embodiments. If used, this encryption may be based on the security association (SA) between Anchor PDSN 216 and Target PDSN 218 or MD5 with shared secrets.

In 236, Target PDSN 218 initializes a session for MS 210 with the received context information from Anchor PDSN 216. Based on the received mobility binding context information, Target PDSN 218 may also send a registration request (RRQ) to HA 220. The RRQ may contain the HoA that MS 210 is using, the new FA-CoA (FA-CoA-1), and the network access identifier (NAI) of the user that MS 210 used for mobile IP registration. Since MS 210 may not send this RRQ, the received MN-HA keying material may be used to compute the MN-HA authorizing-enabling (AE) as the authorization-enabling extension. In certain embodiments, Target PDSN 218 needs to ensure that the ID field in RRQ is more recent than the ID in the RRQ last received from MS 210. In 238, MS 210 incurs the actual handoff (HO) from Source AN 212 to Target AN 214.

In 240, HA 220 processes the RRQ and admits the changes (FA-CoA-1) in the binding cache entry for MS 210. HA 220 responds back to Target PDSN/FA 218 with a registration reply (RRP). HA 220 switches a tunnel from the Anchor PDSN 216 (FA-CoA-0) to the Target PDSN 218 (FA-CoA-1) if an S-bit is not set in the RRQ. In some embodiments, a bi-casting tunnel can be used during the transition from Anchor PDSN 216 to Target PDSN 218. The bi-casting tunnel option may be initiated if the S-bit of the RRQ is set for this option. The bi-casting tunnel may prevent data loss in the handoff of MS 210.

In 242, Target AN 212 sends an A11-Registration-Request to Target PDSN 218 to convey the actual handoff event for MS 210 and also to convert the "Pre-Setup" A10 connection(s) to regular A10 connection(s). In some embodiments, the A10 connections may have been carrying user data already (prior to this step), if Target PDSN 218 was already receiving user packets from HA 220. When Target PDSN 218 accepts the A11-Registration-Request and sends an A11-Registration-Reply, Target PDSN 218 may generate an Accounting START message to AAA server 222 with the 3GPP2-Beginning-Session attribute set to TRUE among other attributes in the message.

In 244, Source AN 212 sends an A11-Registration-Request to the Anchor PDSN 216 with lifetime set to 0 to indicate that MS 210 has departed its coverage area. Anchor PDSN 216 sends a MIP Revocation message to HA 220 to revoke the FA-CoA-0 binding for the mobility session of MS 210. In some embodiments, Anchor PDSN 216 may generate an Accounting STOP message with attributes 3GPP2-Session-Continue set to FALSE. Also, the Acct-Termination-Cause may be set to User Request, and 3GPP2-Release-Indicator may be set to handoff among other attributes in the message.

In certain embodiments, HA 220 may keep simultaneous bindings. If HA 220 keeps simultaneous bindings, HA 220 deletes the FA-CoA-0 binding for the MS's mobility session and responds back with a Revocation Response in 246. If the bi-casting tunnel option was selected, HA 220 tears down the tunnel to Anchor PDSN 216 (FA-CoA-0) leaving the tunnel to Target PDSN 218 (FA-CoA-1) in 248. In some embodiments, the bi-casting tunnel may be setup between Anchor PDSN 216 and Target PDSN 218 with Anchor PDSN 216 forwarding data to Target PDSN 218.

In 250, the data flow continues as usual and MS 210 is unaware of the change in PDSNs (FA-CoA) at this time. The HoA continues to remain in use and Target PDSN 218 de-encapsulates and encapsulates packets to/from MS 210. At some point in time, MS 210 may go dormant because the application it was running closes, or the Mobile IP lifetime in MS 210 expires.

If the Mobile IP lifetime in MS 210 is due for renewal before it goes dormant (as in 250), MS 210 sends an RRQ to Target PDSN 218 with FA-CoA-0 (Anchor PDSN's 216 FA CoA) in 252. This happens, in some embodiments, since MS 210 was not aware of change of CoA. In 254, upon receiving the RRQ with FA-CoA-0, which is an unknown to or unsupported address at Target PDSN 218, Target PDSN 218 determines that it may convey the change of CoA information to MS 210. By conveying the change of CoA, MS 210 can update its mobility binding. In certain embodiments, Target PDSN 218 silently discards the RRQ and sends an Agent Advertisement (AA) message to MS 210 with FA-CoA-1 information and new Lifetime. If MS 210 goes dormant before the MIP lifetime is due for renewal, Target AN 214 can indicate this event to Target PDSN 218 via A11 interface signaling. The A11 interface signaling notice may also trigger Target PDSN 218 to send an Agent Advertisement with FA-CoA-1 information and new Lifetime to MS 210.

In 254, upon receiving the Agent Advertisement from Target PDSN 218, MS 210 performs Mobile IP registration with the FA-CoA-1. The FA-COA-1 binding registration is also renewed by HA 220 for MS 210. In 256, HA 220 renews the FA-CoA-1 binding registration for MS 210.

As may be appreciated by one practiced in the field, certain aspects of the invention may be implemented in a different fashion. For example, A11 "pre-setup" messaging between Target PDSN 218 and Target AN 214, may contain additional or alternative information, or the messages may be sent by a different interface. Further, Anchor PDSN 216 may send context and key materials to Target PDSN 218 based on another cue from another network device, or based on other information available to Target PDSN 218. Additionally, in some embodiments, the AAA server distributes security keying material to Anchor PDSN 216 at the time of initial session setup, and Anchor PDSN 216 distributes the same security keying material to Target PDSN 218 as part of the context message. In some embodiments, after context information transfer, Target PDSN 218 assumes the Anchor PDSN role. The old Anchor PDSN 218 is responsible for revoking/deregistering its session with HA 220. If Revocation is enabled and 'S' bit is not set, in certain embodiments, HA 220 revokes the registration with Anchor PDSN 216 upon the handoff request from Target PDSN 218.

In certain embodiments, simple IPv4 can be used on the wireless network. The call flow is similar to that of FIG. 2 up to the context information transfer completion step (232). However, since the change of PDSNs from Anchor PDSN 216 to Target PDSN 218 also requires a change of the network layer address of MS 210, the handoff cannot be seamless unless the session remains anchored at Anchor PDSN 216. In some embodiments, a fast handoff (FHO) interface can be used.

In other embodiments, Target PDSN 218 can negotiate network control protocol (NCP) again to configure a new network layer address with MS 210 or a procedure defined in X.P0011-D for 3G1x fast handoff with P-P interface can be used. In other embodiments, network based connection management procedures can include a seamless but slightly evolutionary approach in L3 connection and mobility management for simple IPv4 as described in U.S. Provisional Patent Application No.: US 60/758,343 "A System and Method for Mobility Management on Wireless Networks," which is hereby incorporated by reference herein in its entirety.

In certain embodiments, Mobile IPv6 may be used on the wireless network. A Mobile IPv6 implementation is similar to that of Simple IPv4. Typically, the network layer address or care-of address (CoA) is co-located with MS 210 and upon handoff the old CoA can no longer be supported at Target PDSN 218. Although the reason for needing a new CoA is different, the same solutions as present above for IPv4 can be used for Mobile IPv6. Additionally, Simple IPv6 may have the same considerations and solutions as presented for IPv4 and Mobile IPv6.

In some embodiments, the Context Transfer messaging between PDSNs, namely Anchor PDSN 216 and Target PDSN 218, may be based on A11 interface message format as defined in IOS (A.S0008). The A11-Ho_Request message may be initiated by Target PDSN 218 and contain a list of Context_IDs that Target PDSN 218 is requesting Anchor PDSN 216 to transfer. A proposed list of Context_IDs are set forth in the table below:

| Context_ID | Description | Mandatory/Conditional/Optional |
|---|---|---|
| 1 | PPP State | M |
| 2 | Mobility State | M |
| 3 | Accounting State | M - Accounting states may also include counters such as input/output octets, packets, others counters etc. |
| 4 | Security State | M |
| 5 | Compression State | O |
| 6 | QoS State | O |
| 7 | MS version/capability info | O |
| 8 | Prepaid Info | C - If session is prepaid, prepaid info may be transferred. |
| 9 | User Data | O |
| 10 | Vendor Specific Data | O |

In response to the context transfer request, Anchor PDSN 216 responds back with requested context information to Target PDSN 218. The Context information may be formatted in the Context Transfer Normal Vendor Specific Extension as defined below. Each context id is represented in a separate NVSE to allow for a potentially large amount of context information that may need to be passed between the two PDSNs. Note that each NVSE may be limited to 245 bytes of Application Data.

| Application Type | Value | Application Sub Type | Value | Used in Message |
|---|---|---|---|---|
| Context ID List | TBD | Context ID List | TBD | A11-Handoff-Request |
| Context ID | TBD | PPP State | TBD | A11-Handoff-Response |
|  | TBD | Mobility State | TBD | A11-Handoff-Response |
|  | TBD | Accounting State | TBD | A11-Handoff-Response |
|  | TBD | Security State | TBD | A11-Handoff-Response |
|  | TBD | Compression State | TBD | A11-Handoff-Response |
|  | TBD | QoS State | TBD | A11-Handoff-Response |
|  | TBD | MS Version/Capability | TBD | A11-Handoff-Response |
|  | TBD | Prepaid Info | TBD | A11-Handoff-Response |
|  | TBD | User Data | TBD | A11-Handoff-Response |
|  | TBD | Vendor Specific Data | TBD | A11-Handoff-Response |

Figure 3:
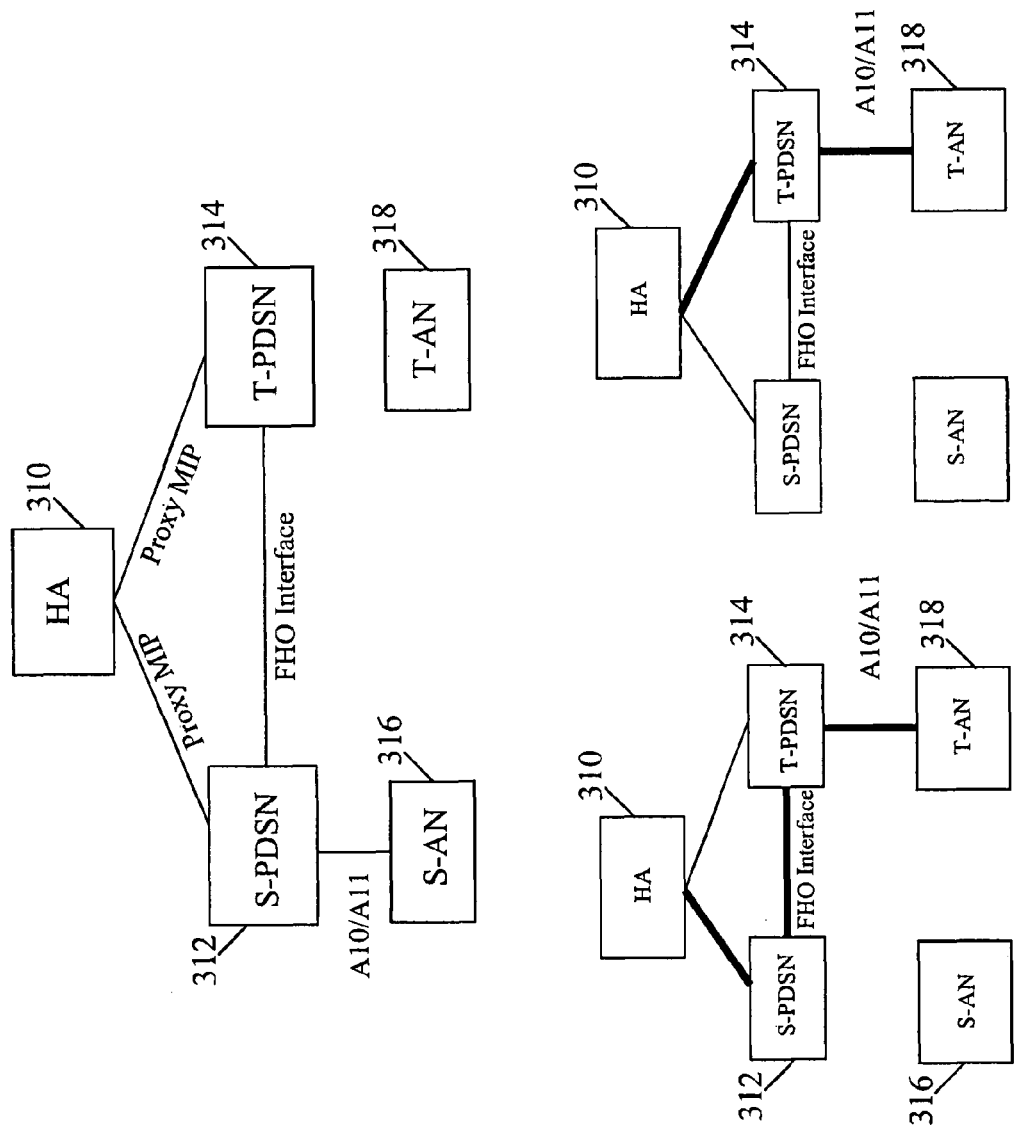
FIG. 3 is a schematic representation of three stages of a fast hand off (FHO) in accordance with certain embodiments of the invention.

FIG. 3 illustrates three stages of a fast hand off (FHO) in accordance with certain embodiments of the invention. The network topology includes home agent (HA) 310, Source-PDSN 312, Target-PDSN 314, Source-Access Network (AN) 316, and Target-Access Network (AN) 318. In some embodiments, inter-PDSN fast handoff includes three elements: FHO tunneling, context transfer, and proxy Mobile IP. The FHO tunnel setup procedure and context transfer may happen in parallel. The FHO interface is used between S-PDSN 312 and T-PDSN 314 to tunnel data during a handoff. The FHO interface can be one or more generic routing encapsulation (GRE) tunnels that are established from an A11 interface trigger at T-PDSN 314. The number of GRE tunnels in the FHO interface corresponds to each A10 connection mapped by T-AN 318, in some embodiments. The GRE tunnels can be used to carry IP packets or frames where the header and/or payload is compressed depending on whether the context transfer has occurred.

Before the start of a handoff, the mobile station (not shown) is coupled to S-AN 316 and S-PDSN 312. S-AN 316 determines that a handoff to T-AN 318 may be required and initiates the handoff through A16 signaling. The address of S-PDSN 312 can be included in the information sent from S-AN 316 to T-AN 318. In some embodiments, T-AN 318 does not have a direct connection to S-PDSN 312 so T-AN 318 selects T-PDSN 314 to serve as the PDSN and sends T-PDSN 314 the address of S-PDSN 312. Then T-AN 318 creates A10 connections for data flows intended to be handed off and sends the mapping information of the mobile station's flows on the A10 connection to T-PDSN 314. T-PDSN 314 can send S-PDSN 312 a HO_Request message that includes the TLVs indicating to S-PDSN 312 to send context information for the mobile station. The HO_Request can also include mapping information T-PDSN 314 received from T-AN 318, and a GRE key for each A10 connection. In some embodiments, S-PDSN 312 sends the context to T-PDSN 314 and indicates in the HO_Response message if T-PDSN 314 can proceed with the handoff or if T-PDSN 314 should wait for another indication before proceeding with the handoff.

If S-PDSN 312 sends a HO_Reponse message to T-PDSN 314 including the request context information TLVs and an indicator to proceed with the handoff, then S-PDSN 312 can begin delivering packets to T-PDSN 314. T-PDSN 314 can forward the packets to T-AN 318 over the mapped A10 connections and forward reverse direction packets to S-PDSN 312 on the GRE tunnels as mapped by T-AN 318. The context on T-PDSN 314 is initialized using the context information received in the HO_Response message. When T-PDSN 314 completes initializing the context and is ready to begin processing packets, T-PDSN 314 can send a message to HA 310 to switch the flow of packets directly to T-PDSN 314 rather than having S-PDSN 312 process the packets. T-PDSN 314 can set an internal timer with a value corresponding to the amount of time T-PDSN 314 waits for S-PDSN 312 to complete sending the processed packet(s) currently in the pipe from HA 310 through S-PDSN 312 to T-PDSN 314. The timer value can be calculated to account for Mobile IP registration to complete and for S-PDSN 312 to deliver the packets in route to T-PDSN 314. When the timer expires, T-PDSN 314 can begin processing packets received from HA 310.

In certain embodiments, S-PDSN 312 can delay the handoff by sending a HO_Response message to T-PDSN 314 including the requested context information TLVs and an indicator that the handoff is delayed. The indicator alerts T-PDSN 314 that another indication, when sent, will trigger the completion of the handoff. T-PDSN 314 sends a handoff acknowledgement message to S-PDSN 312 when T-PDSN 314 has installed the context and is ready to receive packets. In some embodiments, the indication given to T-PDSN 314 after receiving a handoff acknowledgement message is S-PDSN 312 sending one or more packets over the main GRE tunnel. T-PDSN 314 upon receipt of the first packet in the main GRE tunnel sends a binding update or registration request message to HA 310. An internal timer (as described above) can be used to determine when T-PDSN 314 can expect to receive packets from HA 310.

In some embodiments, the context transfer involves a synchronization of the context information. When S-PDSN 312 sends the mobile subscriber's context information, a snapshot of the current context can be taken by S-PDSN 312 and sent to T-PDSN 314. T-PDSN 314, after context initialization, checks the GRE sequence number of received packets to synchronize the context to the state at which S-PDSN 312 stopped processing packets. T-PDSN 314 can begin processing packets received from S-PDSN 312, accounting for packets that it processes, and modifying the accounting context received by the S-PDSN 312 when applicable.

In some embodiments, two events or triggers occur before T-PDSN 314 initiates the proxy Mobile IP (PMIP) registration process to move the MIP tunnel from S-PDSN 312 to T-PDSN 314. First, T-PDSN 314 receives the active start airlink record from T-AN 318. Second, T-PDSN 314 installed the context received from S-PDSN 312 and in the delayed handoff case, delivered the handoff acknowledgement message to S-PDSN 312. T-PDSN 314 can initiate the proxy MIP foreign agent migration procedure to move the MIP tunnel to T-PDSN 314 after these triggers occur. When the proxy MIP registration process is completed, T-PDSN 314 may initiate a teardown of the fast handoff (FHO) interface or wait until the lifetime of the tunnel expires.

Figure 4:
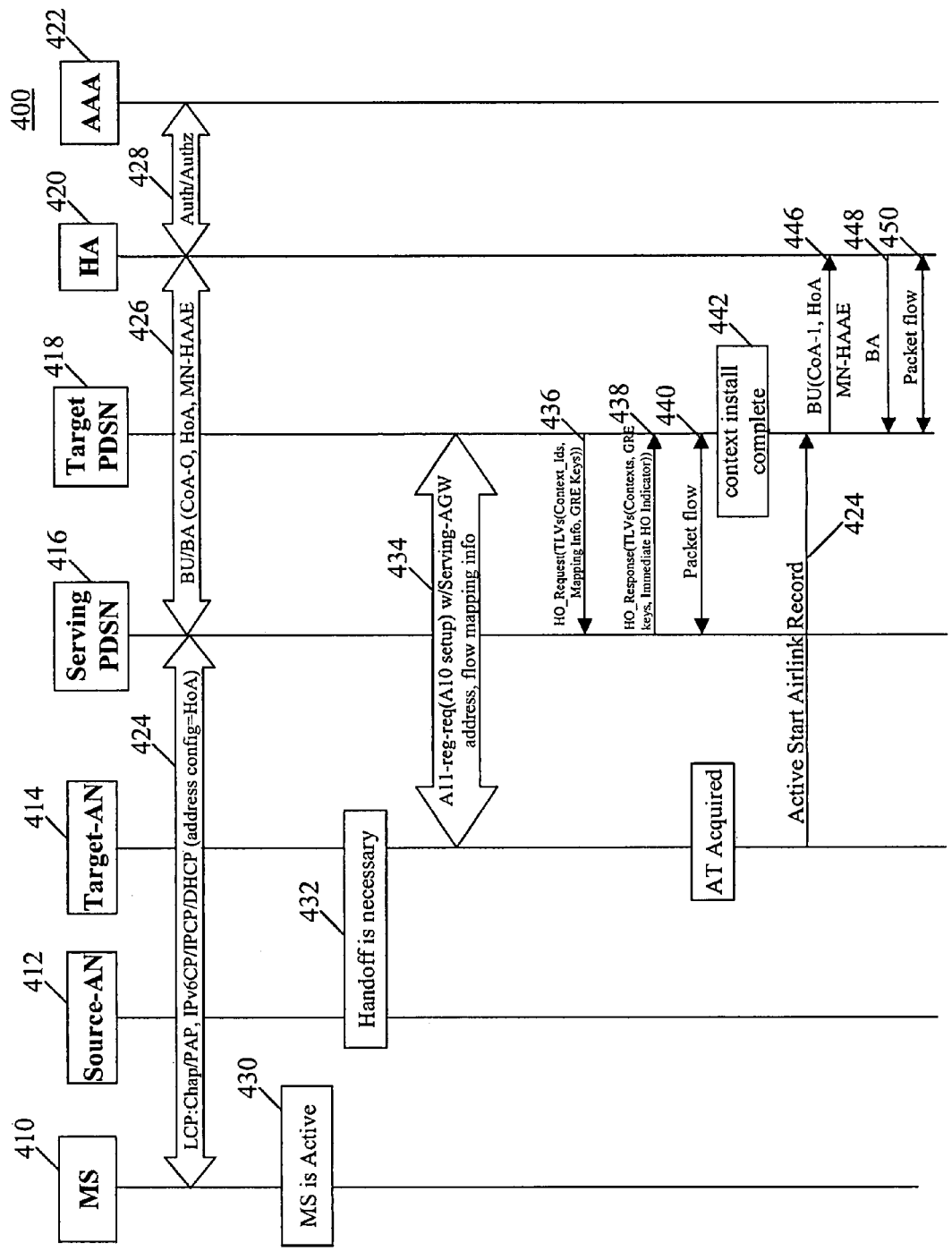
FIG. 4 is a signaling diagram of handoff signaling in accordance with certain embodiments of the invention.

FIG. 4 illustrates handoff signaling 400 in accordance with certain embodiments of the invention. The network devices illustrated in handoff signaling 400 include a mobile station (MS) 410, a S-AN 412, a T-AN 414, a S-PDSN 416, a T-PDSN 418, a HA 420, and an AAA 422. MS 410 begins service by setting up a link and requesting an address from S-PDSN 416 in 424. A number of protocols can be used to make the address request such as Internet Protocol v.6 Control Protocol (IPv6CP), Internet Protocol Control Protocol (IPCP), and Dynamic Host Control Protocol (DHCP). S-PDSN 416 communicates 426 with HA 420 to obtain an IP address. Other information may be exchanged in communication 426 such as a Care-of Address (CoA), a Home Address (HoA), a mobile station-home agent authentication extension (MS-HAAE), which is used for ensuring the integrity of the message. HA 420 authorizes and authenticates in 428 with AAA 422. In some embodiments S-PDSN 416 indicates during an AAA request that it is capable of Proxy MIP and AAA 422 creates and returns a root key for use in Proxy MS-HA authentication (PMS-HA-RK) to S-PDSN 416 and HA 420. In 430, MS 410 initiates an application (e.g., streaming video, multi-user gaming, etc.) and remains active in the running of the application. The application can use the network to send and receive data used in the application (not shown).

In 432, S-AN 412 determines the need for a handoff of MS 410 to T-AN 414. S-AN 412 sends a signaling message (not shown) to T-AN 414 to initiate a session transfer (e.g., HRPD hard handoff) including the identity of S-PDSN 416. T-AN 414 determines that it has the resources to accept the handoff request and sends a signaling message to S-AN 412 to accept the handoff request.

In 434, T-AN 414 determines that the S-PDSN 416 is unreachable from its network link. T-AN 414 selects T-PDSN 418 and sends an A11-registration request to establish A10 connection(s) for the handoff. The A11-registration request message can include the flow_id to A10 mapping information and the address of S-PDSN 416. The presences of the address of S-PDSN 416 indicates that this is a fast handoff request, in some embodiments. In certain embodiments, 434 may occur in parallel with sending the response message in 432.

In 436, T-PDSN 418 sends a HO_Request (handoff request) message to S-PDSN 416. The HO_Request message is sent to the default port 699 (same port as used for A11 signaling), in some embodiments. T-PDSN 418 includes a list of Context_IDs for the contexts requested for transfer from S-PDSN 416. In this message, T-PDSN 418 also includes its GRE keys for bearer tunnels on the FHO interface between the PDSNs and including the flow_id to A10 mapping received from T-AN 414. In certain embodiments, a HO_Request message can be generated and sent when T-PDSN 418 receives the fast handoff request in 434, and can occur in parallel with subsequent radio access network (RAN) procedures (not shown). Ran procedure can include setting up the paging and traffic channels among other things by the access network or base station with the mobile station.

In 438, when S-PDSN 416 receives the HO-Request message, S-PDSN 416 responds back to T-PDSN 418 with a HO_Response message addressed to the port from which the HO_Request message was sent. In the message, S-PDSN 416 includes the requested context information, the PMS-HA-RK keying material, its GRE keys for the bearer tunnels, and an indication that handoff can occur without delay. In some embodiments, GRE tunnels corresponding to each A10 connection are established between the PDSNs.

In 440, S-PDSN 416 delivers packets to T-PDSN 418 over the mapped GRE tunnels and T-PDSN 416 delivers forward direction packets onto the A10 connections as mapped by T-AN 414. Packets can flow to MS 410 once T-AN 414 acquires the MS. T-PDSN 416 delivers reverse direction packets to S-PDSN 416 over the mapped GRE tunnels. In 442, T-PDSN 418 completes the context installation. An A11 message containing an active start airlink record 444 is sent to T-PDSN 418 to start the accounting process. In some embodiments, the accounting begins after the installation of the context.

In 446, T-PDSN 418 sends a binding update (BU) to HA 420. The BU includes the HoA that MS 410 is using, the new CoA (CoA-1), and the network access identifier (NAI) of the user (received as part of the context). The received PMS-HA-RK keying material received in the security context can be used to derive a new key (e.g., pseudo random function (T-PDSN ID, HA ID, PMS-HA-RK)) which is used to compute the MS-HA AE (MS-HA authentication extension). T-PDSN 418 can check that the ID field in the BU is more recent than the ID received in the BU last sent by S-PDSN 416 based on the information received during the context transfer.

In 448, HA 420 processes the BU and stores the changes (such as the CoA-1) in the binding cache entry corresponding to MS 410. HA 420 sends a binding acknowledgement (BA) to T-PDSN 418 and switches the proxy MIP tunnel from S-PDSN 416 (CoA-0) to T-PDSN 418 (CoA-1). In some embodiments, HA 420 can keep the tunnel with CoA-0 up for a configurable amount of time to receive any IP packet(s) that may be in transit from MS 410. When T-PDSN 418 receives the BA, it can start an internal timer that indicates how long T-PDSN 418 waits to receive packets from S-PDSN 416 before processing packets from HA 420.

In 450, once the proxy MIP tunnel is switched from S-PDSN 416 to T-PDSN 418, packets may still be in flight to S-PDSN 416 and from S-PDSN 416 to T-PDSN 418. T-PDSN 418 can wait for the internal timer to expire or wait until it can be determined that the packets in flight have been received before processing packets from HA 420. In the reverse direction, T-PDSN 418 can immediately begin processing packets.

Figure 5:
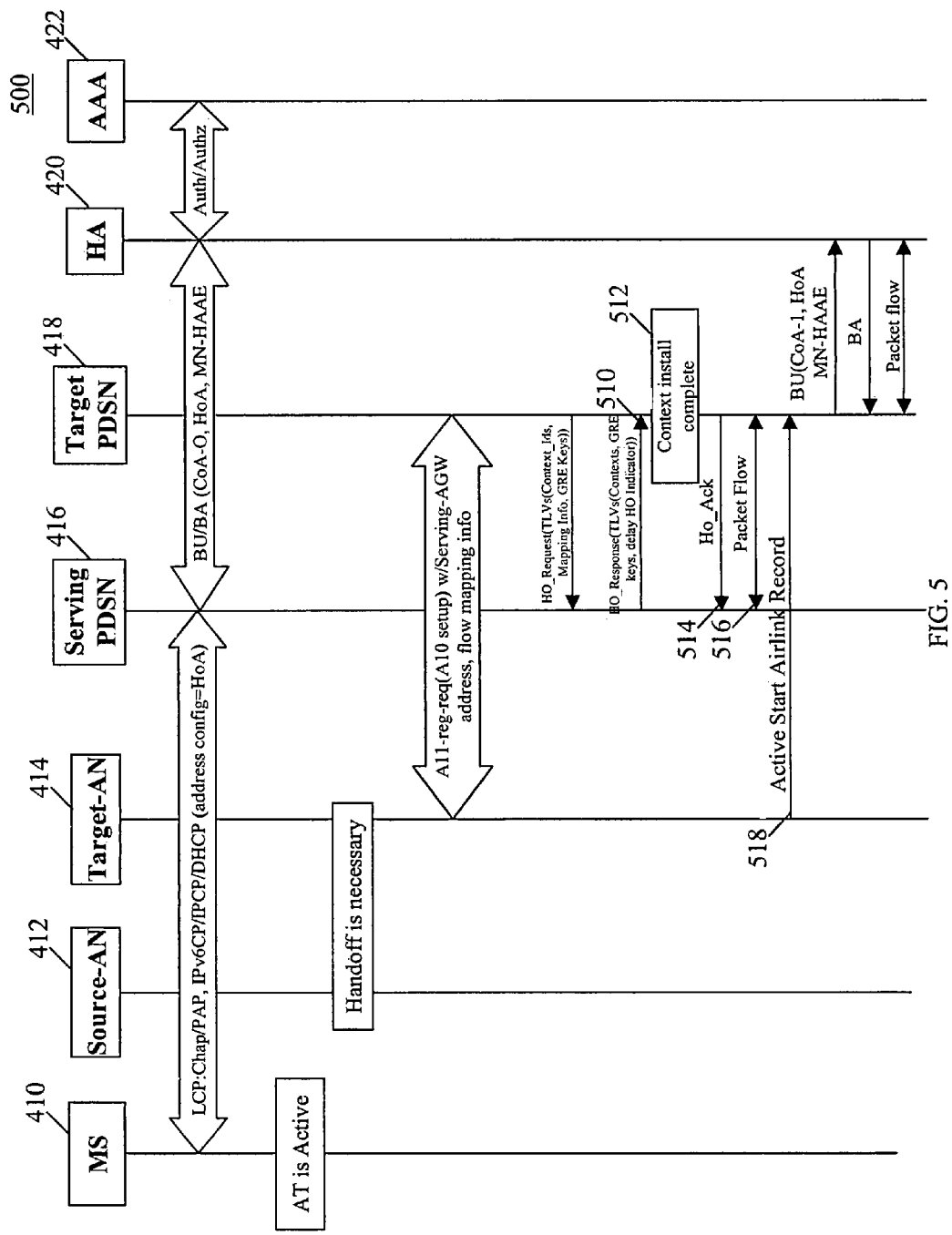
FIG. 5 is a signaling diagram of delayed handoff signaling in accordance with certain embodiments of the present invention.

FIG. 5 illustrates a delayed handoff 500 in accordance with certain embodiments of the invention. Much of the signaling illustrated in delayed handoff 500 is explained above in connection with FIG. 4. In 510, S-PDSN 416 sends T-PDSN 418 a HO_Response message addressed to the port from which the HO_Request message was sent. In the HO_Response message the S-PDSN 416 includes the requested context information, GRE keys for the GRE tunnels between the PDSNs, and an indication that this is to be a delayed handoff. In some embodiments, GRE tunnels corresponding to each A10 connection are established between the PDSNs.

In 512, T-PDSN 418 completes the installation of the context sent from S-PDSN 416. In 514, T-PDSN 418 sends a HO_Ack message to S-PDSN 416 to indicate to S-PDSN 416 that T-PDSN 418 is ready to receive packets.

At some later point, in 516, S-PDSN 416 triggers handoff completion by sending any remaining processed packets and begins sending unprocessed packets. T-PDSN 418 begins processing packets in the forward and reverse directions. In some embodiments, processed packets are sent to S-PDSN 416 over the main GRE tunnel. In 518, when T-AN 414 acquires MS 410 on its air interface, T-AN 414 sends an active start airlink record to T-PDSN 418. In certain embodiments, 518 occurs whenever T-AN 414 begins to serve MS 410.

In some embodiments, one or more GRE tunnels are used between S-PDSN 416 and T-PDSN 418 for transporting packets to and from MS 410. The key field in the GRE header can be used to demultiplex data for different mobile stations as well as for different GRE tunnels for the same mobile station. The protocol field in the GRE header depends on whether a context transfer has been executed. If T-PDSN 418 does not include the context transfer TLVs in the HO_Request, S_PDSN can assume that T-PDSN 418 is incapable of performing context transfer and does not include context information in the HO_Response. In certain embodiments, when a context transfer is not possible, S-PDSN 416 can anchor the session and T-PDSN 418 can act as a pass through for the bearer and may not perform any proxy MIP operation.

The packets sent and received over the GRE tunnel(s) can be point to point protocol (PPP) frames, flows without PPP framing, or header-compressed IP packets if the context transfer between the PDSNs is delayed or if it is before the context has been installed on T-PDSN 418. If the processing is occurring on S-PDSN 416, then a one-to-one correspondence between the number of GRE tunnels and the number of A10 connections to T-AN 414 can exist. The flow mapping among the multiple GRE tunnels can occur at S-PDSN 416 based on the mapping by T-AN 414. When context is established in T-PDSN 418 (by sending a HO_Ack message to S-PDSN 416), the GRE frames subsequently delivered by the S-PDSN 416 can include unprocessed packets. Unprocessed packets can be delivered in one GRE tunnel carrying packets for MS 410, and the flow mapping operation can take place in T-PDSN 418. The GRE header can include appropriate attribute TLVs to indicate which format is in use.

Figure 6:
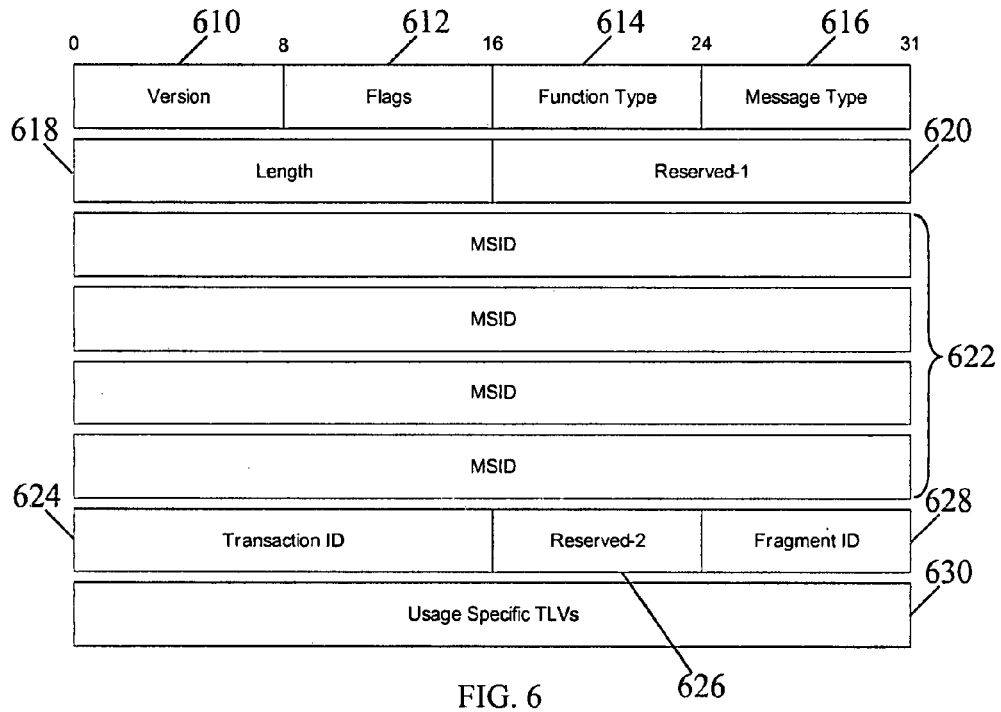
FIG. 6 illustrates a generic message header in accordance with certain embodiments of the invention.

A generic protocol message format can be used to carry the handoff specific signaling and information elements between T-PDSN 418 and S-PDSN 416. The generic protocol messages can be transported over user datagram protocol (UDP). FIG. 6 illustrates a generic message header 600 in accordance with certain embodiments of the invention. Generic message header 600 includes fields such as: version 610, flags 612, function type 614, message type 616, length 618, reserved-1 620, MSID 622, transaction ID 624, Reserved-2 626, Fragment ID 628, and Usage Specific TLVs 630. Version 610 indicates the version of the message header and usage specific TLVs. Flags 612 can be used to indicate information such as transaction ID reset and last fragment. The flags can operate on a bit by bit basis or as combinations of bits. For example, in bit by bit, if the rightmost bit is set as a fragment ID bit then when that bit is "1" it can indicate that this is the last fragment. Other flags can also be included in this field.

Function type 614 indicates the specific function performed with the message. For example, when function type 614 takes a value of "1" this indicates it is a handoff function. Message type 616 indicates the type of message under the specific function type. For a handoff message function the following message types are included: a handoff request, a handoff response, and a handoff acknowledgement. Length 618 indicates the length of the entire message including the header fields and the usage specific TLVs. Reserved-1 620 is reserved for future use and may be used for a variety of purposes when defined. MSID 622 carries the mobile station ID for which the message is issued.

Transaction ID 624 carries a number that is used to correlate the requests, responses and acknowledgements resulting from the same event. Two peers (e.g., T-PDSN 418 and S-PDSN 416) begin with a transaction ID of "1" for a given MSID and the transaction ID number is monotonically increased each time a new set of messages is exchanged between the peers. If re-transmission occurs, the transaction ID is kept unchanged by the sender. In some embodiments, the transaction ID is unique for the set including: source IP address, destination IP address, and the MSID, and only one transaction ID for a MSID may remain outstanding, so a new message is not issued while a message is pending. In certain embodiments, a handoff request, a handoff response, and a handoff acknowledgement use the same transaction ID.

A handoff request (HO_Request) message can be defined by a function type 614 of "1" and a message type 616 of "1." This message is issued by T-PDSN 418 to initiate the handoff process with S-PDSN 416. This type of message can include the GRE-key value for receiving messages from S-PDSN 416 and the context transfer request for the MSID. A handoff response message (HO_Response) can be defined by a function type 614 of "1" and a message type 616 of "2." This message is issued by S-PDSN 416 and sent to T-PDSN 418 in response to the HO_Request message. This type of message can include the GRE key value for receiving messages from T-PDSN 418 and the requested context information. The contexts can be carried in a series of TLVs. The S-PDSN copies the transaction ID 624 from the HO_Request message for inclusion in the HO_Response message. A handoff acknowledgement (HO_Ack) can be defined by a function type 614 of "1" and a message type 616 of "3." This message indicates the result of the context transfer operation through a status code TLV.

Reserved-2 626 is reserved for future use and may be used for a variety of purposes when defined. Fragment ID 628 indicates which fragment of a larger message this packet represents and can be used to reconstruct the larger message. Messages larger than the protocol being used to send the messages, can be fragmented using the fragment flag and fragment ID 628. Usage specific TLVs 630 are a series of TLV encoded information that the messages carry between the peers. The usage specific TLVs 630 include a GRE key, a User ID (NAI), a LCP state, an IPCP state, an IPv6CP state, a CCP state, a PMIPv4 mobility state, a PMIPv6 mobility state, a header compression state, a QoS state, a TFTv4 state, a TFTv6 state, an authorization state, a vendor specific state, a state request, a status code, and a message authenticator TLV.

Figure 7:
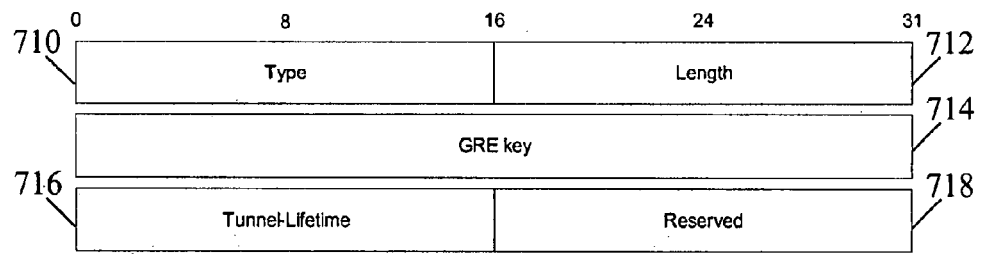
FIG. 7 illustrates a GRE key usage specific TLV in accordance with certain embodiments of the invention.

FIG. 7 illustrates a GRE key usage specific TLV in accordance with certain embodiments of the invention. GRE key fields include type 710, length 712, GRE key 714, tunnel-lifetime 716, and reserved 718. The GRE key message carries the GRE key that the sender of the message wants to use for receiving any GRE packets from the peer. T-PDSN 418 can include the GRE key TLV when setting up the GRE tunnel with S-PDSN 416. In some embodiments, if the GRE key is included in the HO_Request message from T-PDSN 418, then S-PDSN 416 can reflect back the same TLV in the HO_Response to acknowledge receipt. Type 710 indicates the kind of TLV message (e.g., "1") and length 712 indicates the length in bytes of the message (e.g., 12 bytes). GRE key 714 is a number defined in RFC 2890, section 2.1, which is hereby incorporated by reference herein in its entirety. The sender includes this number for the receiver to use in the GRE header when sending data packets to the sender. Tunnel-lifetime 716 is the number of seconds remaining before the tunnel state is considered expired. A value of zero indicates a request for a tunnel teardown and a value of 0xffff indicates infinity. Reserved 718 indicates the area is set aside for future use.

Figure 8:
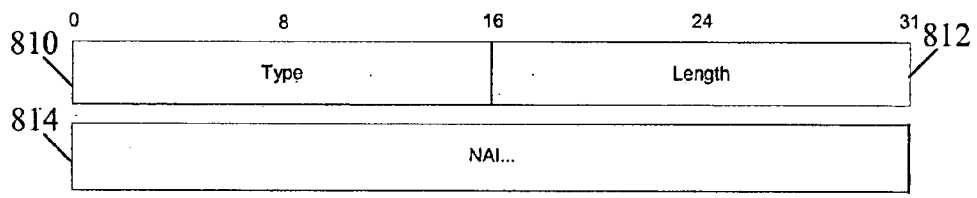
FIG. 8 illustrates a User ID usage specific TLV in accordance with certain embodiments of the invention.

FIG. 8 illustrates a User ID usage specific TLV in accordance with certain embodiments of the invention. The User ID fields include type 810, length 812, and network access identifier (NAI) 814. The User ID carries the NAI of the user associated with the message. Type 810 indicates the kind of TLV message (e.g., "2") and length 812 indicates the length in bytes of the message (e.g., less than or equal to 74 bytes). NAI 814 is the NAI associated with the user as authenticated by the PDSN. The format of the NAI can be given by RFC 2486, which is hereby incorporated by reference herein in its entirety.

Figure 9:
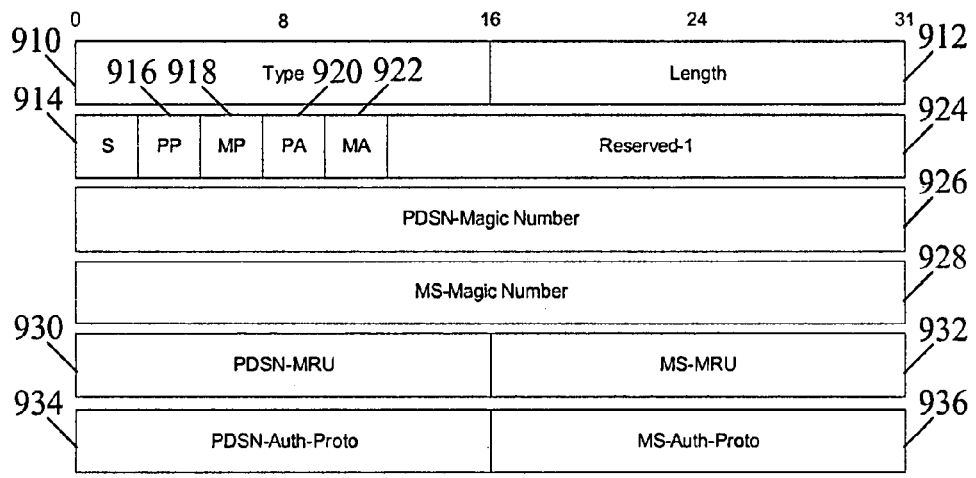
FIG. 9 illustrates a LCP state usage specific TLV in accordance with certain embodiments of the invention.

FIG. 9 illustrates a LCP state usage specific TLV in accordance with certain embodiments of the invention. The LCP state fields include type 910, length 912, state bit (S) 914, PDSN protocol field compression (PFC) bit (PP) 916, MS PFC bit (MP) 918, PDSN address and control field compression (ACFC)-bit (PA) 920, MS ACFC bit (MA) 922, reserved-1 924, PDSN-magic number 926, MS-magic number 928, PDSN-MRU 930, MS-MRU 932, PDSN-Auth-Proto 934, and MS-Auth-Proto 936. This TLV includes the parameters negotiated with link control protocol (LCP) during PPP connection establishment between the PDSN and the MS. Type 910 indicates the kind of TLV message (e.g., "3") and length 912 indicates the length in bytes of the message (e.g., 24 bytes). S-bit 914 is a LCP state bit that indicates whether the LCP is in an open state or a closed state. LCP open state means that both gateways have exchanged configuration Ack message so that negotiation is complete. Closed state means that LCP negotiation has not started. PP-bit 916 indicates whether the PDSN has negotiated PFC with the MS. MP-bit 918 indicates whether the MS has negotiated PFC with the PDSN. PA-bit 920 indicates whether the PDSN has negotiated ACFC with the MS. MA-bit 922 indicates whether the MS has negotiated ACFC with the PDSN. More information on PFC and ACFC can be found in RFC 1661, which is hereby incorporated by reference herein in its entirety. Reserved-1 924 can be used in the future.

PDSN-magic number 926 carries the magic number negotiated by the PDSN with the MS. The magic number can be used in each direction in LCP messages to guard against loop back connections. This allows the sender to determine that communications with a peer are indeed a different party and not itself. MS-magic number 928 carries the magic number negotiated by the MS with the PDSN. PDSN-MRU 930 carries the maximum-receive-unit (MRU) negotiated by the PDSN with the MS. MS-MRU 932 carries the maximum-receive-unit (MRU) negotiated by the MS with the PDSN. PDSN-Auth-Proto 934 carries the authentication-protocol negotiated by the PDSN with the MS. MS-Auth-Proto 936 carries the authentication-protocol negotiated by the MS with the PDSN.

Figure 10:
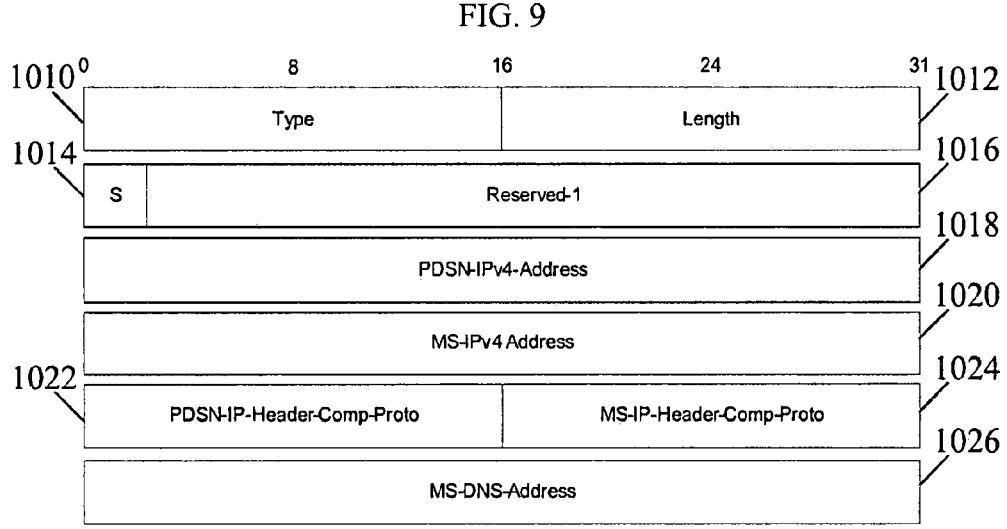
FIG. 10 illustrates an IPCP state usage specific TLV in accordance with certain embodiments of the invention.

FIG. 10 illustrates an IPCP state usage specific TLV in accordance with certain embodiments of the invention. The IPCP state fields include type 1010, length 1012, S-bit 1014, Reserved-1 1016, PDSN-IPv4-Address 1018, MS-IPv4-Address 1020, PDSN-IP-Header-Comp-Proto 1022, MS-IP-Header-Comp-Proto 1024, and MS-DNS-Address 1026. This TLV includes the parameters negotiated via IPCP during PPP connection establishment between the PDSN and the MS. Some of the fields included in the IPCP state TLV are further defined in RFC 1332, which is hereby incorporated by reference herein in its entirety. Type 1010 indicates the kind of TLV message (e.g., "4") and length 1012 indicates the length in bytes of the message (e.g., 24 bytes). S-bit 1014 is a network control protocol (NCP) or IPCP state bit that indicates whether the NCP is in an open state or a closed state. Reserved-1 1016 can be used in the future. PDSN-IPv4-Address 1018 carries the IPv4 address of the PDSN that was sent to the MS. MS-IPv4-Address 1020 carries the IPv4 address that is assigned to the MS. In some embodiments, such as for a common management interface protocol (CMIPv4) session, this address is set to 0.0.0.0. PDSN-IP-Header-Comp-Proto 1022 carries the IP header compression protocol negotiated by the PDSN. MS-IP-Header-Comp-Proto 1024 carries the IP header compression protocol negotiated by the MS. MS-DNS-Address 1026 carries the domain name service (DNS) server IPv4 address that the PDSN sent to the MS. In some embodiments, the MS may not request this information and the field can be set to zeros.

Figure 11:
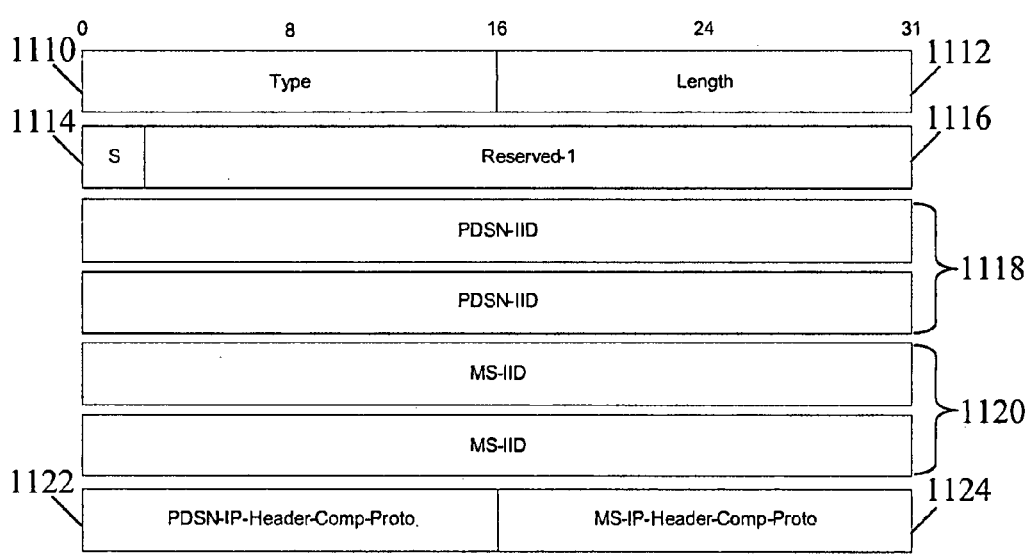
FIG. 11 illustrates an IPv6CP state usage specific TLV in accordance with certain embodiments of the invention.

FIG. 11 illustrates an IPv6CP state usage specific TLV in accordance with certain embodiments of the invention. The IPv6CP state fields include type 1110, length 1112, S-bit 1114, Reserved-1 11116, PDSN-IID 1118, MS-IID 1120, PDSN-IP-Header-Comp-Proto 1122 and MS-IP-Header-Comp-Proto 1124. This TLV includes the parameters negotiated via IPv6CP during PPP connection establishment between the PDSN and the MS. The fields are further defined in RFC 2472, which is incorporated by reference herein in its entirety. Type 1110 indicates the kind of TLV message (e.g., "5") and length 1112 indicates the length in bytes of the message (e.g., 28 bytes). S-bit 1114 is a network control protocol (NCP) or IPv6CP state bit that indicates whether the NCP is in an open state or a closed state. Reserved-1 1116 can be used in the future. PDSN-IID 1118 carries the Interface ID (IID) of the PDSN that was sent to the MS. MS-IID 1120 carries the Interface ID (IID) that is assigned to the MS or that is sent by the MS as its IID. PDSN-IP-Header-Comp-Proto 1122 carries the IP header compression protocol negotiated by the PDSN. MS-IP-Header-Comp-Proto 1124 carries the IP header compression protocol negotiated by the MS.

Figure 12:
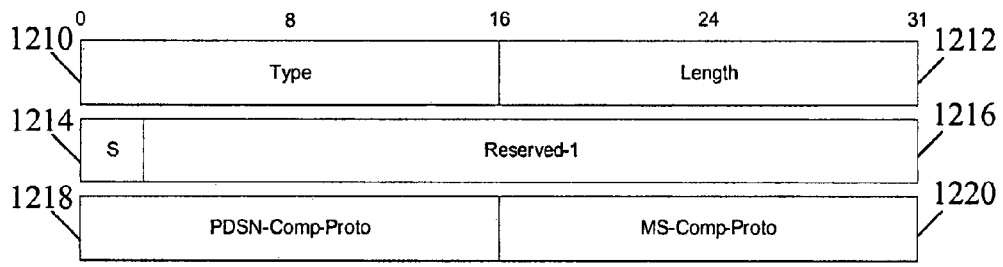
FIG. 12 illustrates a compression control protocol (CCP) state usage specific TLV in accordance with certain embodiments of the invention.

FIG. 12 illustrates a compression control protocol (CCP) state usage specific TLV in accordance with certain embodiments of the invention. The CCP state fields include type 1210, length 1212, S-bit 1214, Reserved-1 1216, PDSN-Comp-Proto 1218, and MS-Comp-Proto 1220. The CCP state TLV includes the parameters negotiated via CCP during PPP connection establishment between the PDSN and the MS. The fields are further defined in RFC 1962, which is incorporated by reference herein in its entirety. Type 1210 indicates the kind of TLV message (e.g., "6") and length 1212 indicates the length in bytes of the message (e.g., 12 bytes). S-bit 1214 is a CCP state bit that indicates whether the CCP is in an open state or a closed state. Reserved-1 1216 can be used in the future. PDSN-Comp-Proto 1218 carries the CCP configuration option sent by the PDSN during a CCP exchange with the MS. MS-Comp-Proto 1220 carries the CCP configuration option sent by the MS during a CCP exchange with the PDSN.

Figure 13:
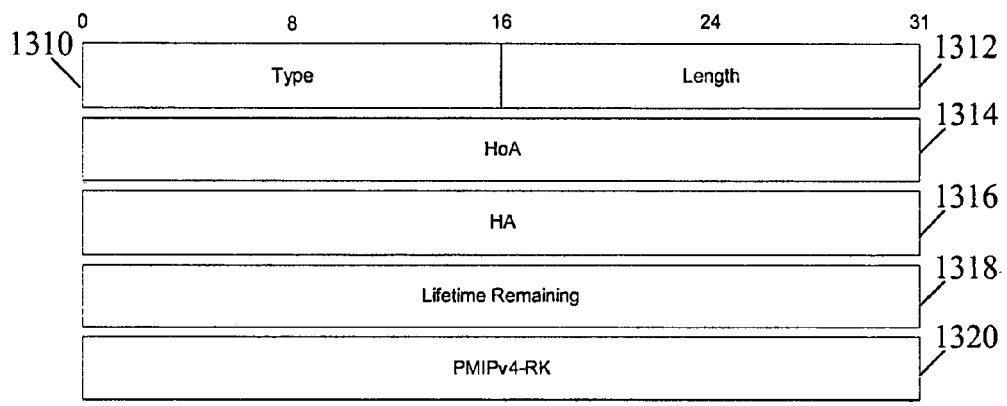
FIG. 13 illustrates a PMIPv4 mobility state usage specific TLV in accordance with certain embodiments of the invention.

FIG. 13 illustrates a PMIPv4 mobility state usage specific TLV in accordance with certain embodiments of the invention. The PMIPv4 mobility state fields include type 1310, length 1312, home address (HoA) 1314, home agent 1316, lifetime remaining 1318, and PMIPv4-RK 1320. The PMIPv4 mobility state TLV includes the parameters required to re-create the PMIPv4 mobility state. Type 1310 indicates the kind of TLV message (e.g., "7") and length 1312 indicates the length in bytes of the message (e.g., 20 bytes). HoA 1314 is the HoA obtained from the HA for the MS. This can be the IPv4 address the MS is using for the session. HA 1316 is the HA address with which the PMIPv4 binding exists for the MS. Lifetime remaining 1318 is the remaining lifetime of the PMIP session. The lifetime remaining field allows the receiver to renew the PMIPv4 session before the time exhausts. In some embodiments, it represents the number of seconds since Jan. 1, 1970 00:00 UTC. PMIPv4-RK 1320 is the root key for proxy mobile IP (PMIP) operation.

Figure 14:
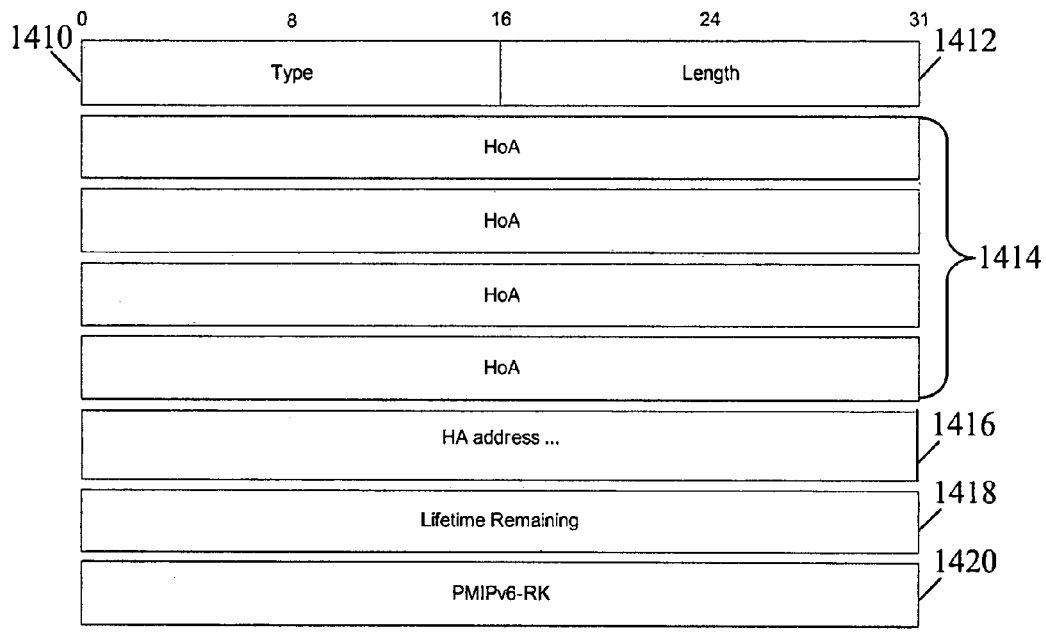
FIG. 14 illustrates a PMIPv6 mobility state usage specific TLV in accordance with certain embodiments of the invention.

FIG. 14 illustrates a PMIPv6 mobility state usage specific TLV in accordance with certain embodiments of the invention. The PMIPv6 mobility state fields include type 1410, length 1412, HoA 1414, HA address 1416, lifetime remaining 1418, and PMIPv6-RK 1420. The PMIPv6 mobility state TLV includes the parameters to re-create the PMIPv6 mobility state. Type 1410 indicates the kind of TLV message (e.g., "8") and length 1412 indicates the length in bytes of the message (e.g., less than or equal to 48 bytes). HoA 1414 is the HoA obtained from the HA for the MS. This can be the IPv6 address the MS is using for the session. HA 1416 is the HA address with which the PMIP binding exists for the MS. This address can be either an IPv4 address or an IPv6 address. Lifetime remaining 1418 is the remaining lifetime of the PMIP session. PMIPv4-RK 1420 is the root key for proxy mobile IP (PMIP) operation.

Figure 15:
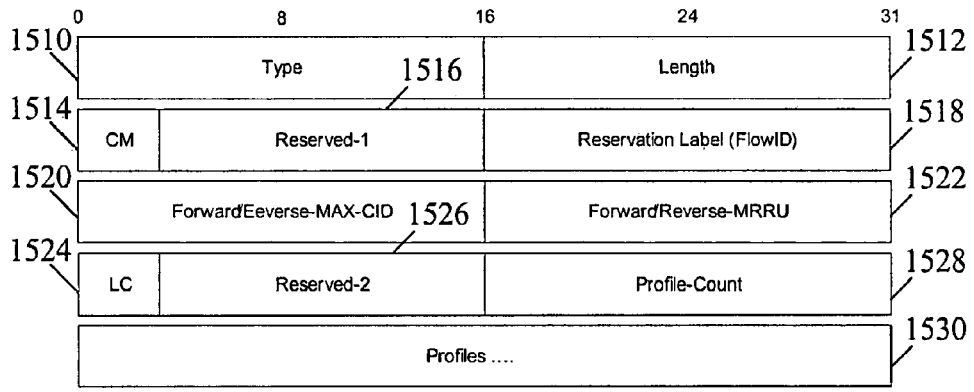
FIG. 15 illustrates a header compression state usage specific TLV in accordance with certain embodiments of the invention.

FIG. 15 illustrates a header compression state usage specific TLV in accordance with certain embodiments of the invention. The header compression state fields include type 1510, length 1512, Context Identifier (CID) mode (CM) 1514, Reserved-1 1516, reservation label 1518, Forward/Reverse-MAX-CID 1520, Forward/Reverse maximum received reconstructed unit (MRRU) 1522, large CID (LC) 1524, Reserved-2 1526, profile-count 1528, and profiles 1530. The header compress state TLV includes the parameters negotiated for robust header compression (ROHC). Type 1510 indicates the kind of TLV message (e.g., "9") and length 1512 indicates the length in bytes of the message (e.g., greater than or equal to 24 bytes). CM 1514 provides whether the CID is small ("0") or large ("1"). The CID space can be negotiated to be either small, which means that CIDs can take the values 0 through 15, or large, which means that CIDs take values between 0 and 2^14−1=16383. Reserved-1 1516 can be used in the future. Reservation label 1518 is the FlowID associated with this ROHC parameter set. Forward/Reverse-MAX-CID 1520 carries the max-CID to be used for this ROHC state. The parameters can be specified separately for each direction. Forward/Reverse MRRU 1522 carries the MRRU to be used for this ROHC state. The parameters can be specified separately for each direction. LC 1524 indicates whether large CIDs are supported. Reserved-2 1526 can be used in the future. Profile-count 1528 indicates the number of profiles supported. Profile-count 1528 can be exchanged with the MS at the time of ROHC parameter negotiation. Profiles 1530 carries one or more octet-pairs in ascending order with each octet-pair specifying a ROHC profile supported. For more information see RFC 3241, which is hereby incorporated by reference herein in its entirety.

Figure 16:
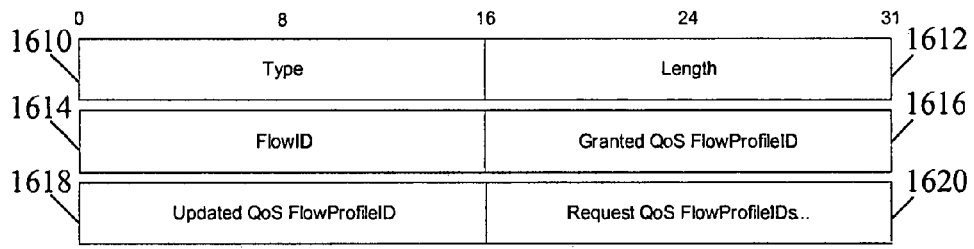
FIG. 16 illustrates a Quality of Service (QoS) state usage specific TLV in accordance with certain embodiments of the invention.

FIG. 16 illustrates a Quality of Service (QoS) state usage specific TLV in accordance with certain embodiments of the invention. The QoS state fields include type 1610, length 1612, FlowID 1614, Granted QoS FlowProfileID 1616, Updated QoS FlowProfileID 1618, and Requested QoS FlowProfileIDs 1620. The QoS state TLV includes the parameters related to QoS for the MS. Additional information regarding some of the fields can be found in 3GPP2 X.S0011-D specification, which is hereby incorporated by reference herein in its entirety. Type 1610 indicates the kind of TLV message (e.g., "10") and length 1612 indicates the length in bytes of the message (e.g., greater than or equal to 12 bytes). FlowID 1614 carries an ID to associate with the QoS parameters being reported. Granted QoS FlowProfileID 1616 carries the granted QoS profile information for the FlowID. Updated QoS FlowProfileID 1618 carries the requested QoS for the FlowID. Requested QoS FlowProfileIDs 1620 carries a list of requested QoS for the FlowID. Each FlowProfileID can be 2 bytes long.

Figure 17:
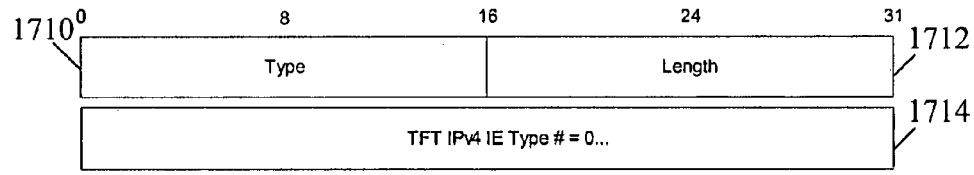
FIG. 17 illustrates a traffic flow template (TFTv4) state usage specific TLV in accordance with certain embodiments of the invention.
Figure 18:
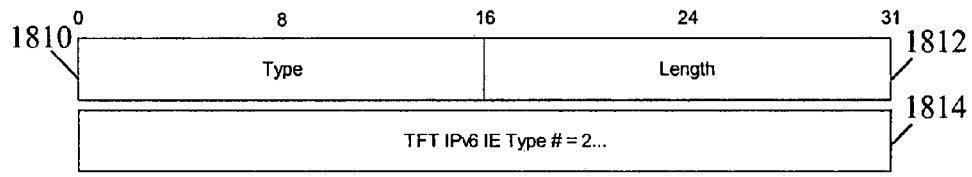
FIG. 18 illustrates a traffic flow template (TFTv6) state usage specific TLV in accordance with certain embodiments of the invention.

FIG. 17 illustrates a traffic flow template (TFTv4) state usage specific TLV in accordance with certain embodiments of the invention. The TFTv4 state fields include type 1710, length 1712, and Traffic Flow Template IPv4 Information Element (TFT IPv4 IE) type 1714. Type 1710 indicates the kind of TLV message (e.g., "11") and length 1712 indicates the length in bytes of the message (e.g., greater than 4 bytes). Traffic Flow Template IPv4 Information Element can include the MS IPv4 address and the set of packet filters (IP rules) to be applied to the traffic flow. FIG. 18 illustrates a traffic flow template (TFTv6) state usage specific TLV in accordance with certain embodiments of the invention. The TFTv6 state fields include type 1810, length 1812, and TFT IPv6 IE type 1814. Type 1810 indicates the kind of TLV message (e.g., "12") and length 1812 indicates the length in bytes of the message (e.g., greater than 4 bytes). TFT IPv6 IE is similar to TFT IPv4 IE, except that TFT IPv6 IE is for IPv6.

Figure 19:
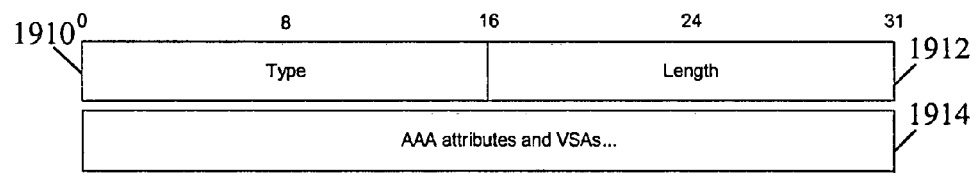
FIG. 19 illustrates an authorization state usage specific TLV in accordance with certain embodiments of the invention.

FIG. 19 illustrates an authorization state usage specific TLV in accordance with certain embodiments of the invention. The authorization state fields include type 1910, length 1912, and AAA attributes and vender specified attributes (VSAs) 1914. The authorization state TLV includes the parameters that are related to the authorization state for the MS. The parameters can include remote authentication dial-in user service (RADIUS) VSAs as well as attributes received from the Home Authentication, Authorization, and Accounting (HAAA) server at the time of authorization and authentication. These attributes can include Subscriber QoS profile, session timeout values, and hot-lining parameters. A more complete list can be found in 3GPP2 X.S0011-D specification. Type 1910 indicates the kind of TLV message (e.g., "13") and length 1912 indicates the length in bytes of the message (e.g., greater than 4 bytes). AAA attributes and VSAs 1914 can include one or more AAA attributes and VSAs related to the authorization of the user's packet data service.

Figure 20:
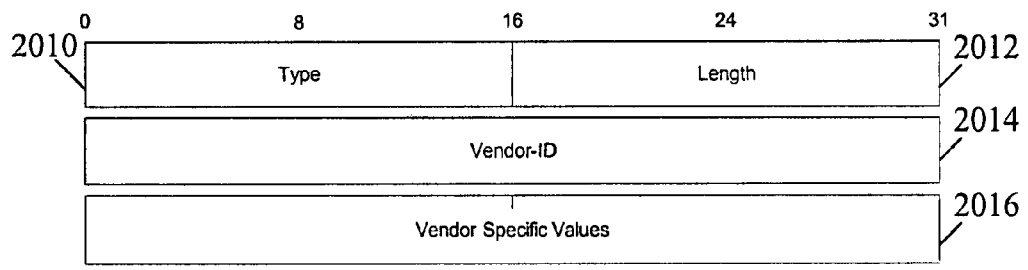
FIG. 20 illustrates a vendor specific (VSA) state usage specific TLV in accordance with certain embodiments of the invention.

FIG. 20 illustrates a vendor specific state usage specific TLV in accordance with certain embodiments of the invention. The vendor specific state fields include type 2010, length 2012, Vendor-ID 2014, and vendor specific values 2016. The vendor specific TLV can include the parameters required by a specific vendor's implementation. Type 2010 indicates the kind of TLV message (e.g., "14") and length 2012 indicates the length in bytes of the message (e.g., greater than 4 bytes). Vendor-ID 2014 carries a vendor identifier for the vendor that has a specific use for this TLV. Vendor specific values 2016 is populated based on a vendor's desired implementation. In some embodiments, the field is opaque to any implementations that cannot parse the field.

Figure 21:
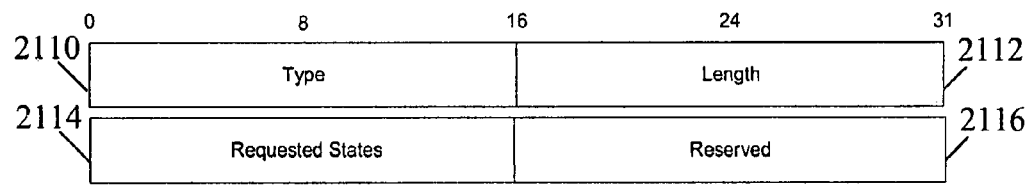
FIG. 21 illustrates a state request usage specific TLV in accordance with certain embodiments of the invention.

FIG. 21 illustrates a state request usage specific TLV in accordance with certain embodiments of the invention. The state request fields include type 2110, length 2112, requested states 2114, and reserved 2116. The state request TLV can be used by the T-PDSN to trigger S-PDSN to send specific state information. In some embodiments, this TLV is sent in the HO_Ack message. Type 2110 indicates the kind of TLV message (e.g., "15") and length 2112 indicates the length in bytes of the message (e.g., 8 bytes). Request states can indicate one of the following values defined for handoff operation:

| | |
|---|---|
| 0x00000000 | State Not Requested |
| 0x00000001 | All Available Session States Requested |
| 0x00000002 | PPP State |
| 0x00000003 | PMIPv4 Mobility State |
| 0x00000004 | PMIPv6 Mobility State |
| 0x00000005 | Header Compression State |
| 0x00000006 | QoS State |
| 0x00000007 | TFTv4 State |
| 0x00000008 | TFTv6 State |
| 0x00000009 | Authorization State |
| 0x00000010 | Vendor Specific State |

Other values are reserved and reserved 2116 can be used in the future.

Figure 22:
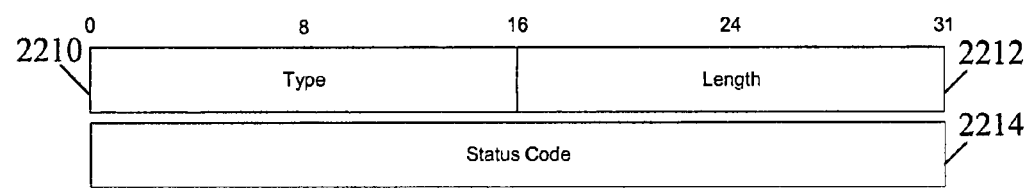
FIG. 22 illustrates status code usage specific TLV in accordance with certain embodiments of the invention.

FIG. 22 illustrates status code usage specific TLV in accordance with certain embodiments of the invention. The status code fields include type 2210, length 2212, and status code 2214. The status code TLV carries the status code for the ongoing operation. For handoffs, this includes the status code to indicate whether the context was received and installed successfully. Type 2210 indicates the kind of TLV message (e.g., "16") and length 2212 indicates the length in bytes of the message (e.g., 8 bytes). Status code can be a binary number that indicates one of the following values defined for handoff operation:

0. Context Successfully Installed.
  1. Context Install Failed. (The T-PDSN may send a subsequent HO_Request with the State Request TLV as defined above to request the context that failed installation.)
  2. Mandatory fields missing.
  3. Cannot find the record for the MSID.
  4. Invalid Transaction ID.
  5. Fragment Missing.
  6. Tunnel setup failed. (invalid GRE key)

Other values are reserved for future use as desired.

Figure 23:
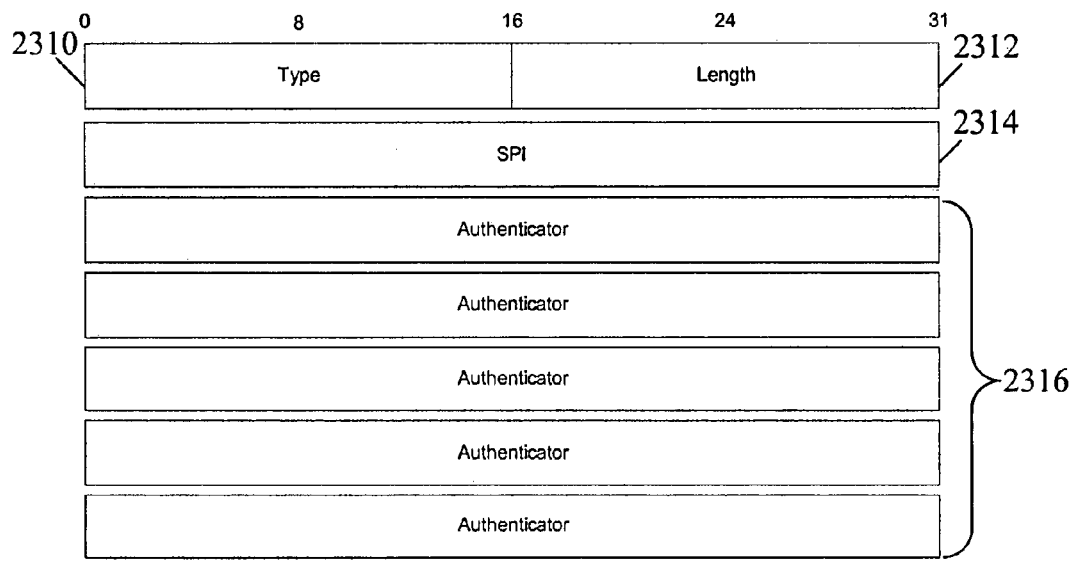
FIG. 23 illustrates a message authenticator usage specific TLV in accordance with certain embodiments of the invention.

FIG. 23 illustrates a message authenticator usage specific TLV in accordance with certain embodiments of the invention. Message authenticator fields include type 2310, length 2312, stateful packet inspection (SPI) 2314, and authenticator 2316. The message authenticator TLV carries a message authenticator computed over the entire message including the header excluding this TLV. The authenticator can be computed using a shared key between two peer devices (e.g., the T-PDSN and the S-PDSN). The shared key (at least 160 bits long) can be provisioned between the peer devices if optional message integrity protection is desired. An algorithm that can be used for this computation is hashed message authentication code-secure hash algorithm (HMAC-SHA-1). In some embodiments, IPSec encapsulating security payload (ESP) can be used to secure communications between the sender and receiver instead or in conjunction with this TLV. Type 2310 indicates the kind of TLV message (e.g., "17") and length 2312 indicates the length in bytes of the message (e.g., 28 bytes). SPI 2314 carries the SPI for the security association (SA) that computes and validates the authenticator 2316. The SPI value can be provisioned in the sender and the receivers. Authenticator 2316 can carry the first 160 bits of the output of the HMAC-SHA-1 computation, which includes computing: (Shared Key|Transaction ID| Message Body including the header excluding the Authenticator TLV).

The table below lists the various usage specific TLVs as well as information regarding their usage in different types of messages. In the table below, "1" means typically included in the message, "0-1" means optionally included in the message, and "0" means typically not included in the message, in accordance with some embodiments of the invention.

| TLV | HO_Request | HO_Response | HO_Ack | Notes |
|---|---|---|---|---|
| GRE Key | 0-1 | 0-1 | 0 | May not be present if performing context transfer and no GRE tunnel setup is requested. |
| User ID (NAI) | 0-1 | 1 | 1 | The NAI of the user may not be available at the time of sending the HO_Request |
| LCP State | 0 | 1 | 0 | |
| IPCP State | 0 | 0-1 | | Present in HO_Response if it is an IPv4 session. |
| IPv6CP State | 0 | 0-1 | | Present in HO_Response if it is an IPv6 session. |
| CCP State | 0 | 0-1 | | Present in HO_Response if CCP is used. |
| PMIPv4 Mobility State | 0 | 0-1 | 0 | The HO_Response may contain this TLV for Simple IPv4 via PMIPv4. |
| PMIPv6 Mobility State | 0 | 0-1 | 0 | The HO_Response may contain this TLV for Simple IPv6 via PMIPv6. |
| Header Compression State | 0 | 0-1 | 0 | If ROHC is used for a flow or if ROHC is negotiated with the MS, this TLV may be present in the HO_Response. |
| QoS State | 0 | 0-1 | 0 | If QoS state is available, it can be included. |
| TFTv4 State | 0 | 0-1 | 0 | If TFTv4 state is available, it can be included |
| TFTv6 State | 0 | 0-1 | 0 | If TFTv6 state is available, it can be included. |
| Authorization State | 0 | 0-1 | 0 | |
| Vendor Specific State | 0 | 0-1 | 0 | |
| State Request | 1 | 0 | 0-1 | Can be included in the HO_Ack with appropriate bit-mask setting if state info from the MS is desired. |
| Status Code | 0 | 0-1 | 1 | May be included in the HO_Response if the HO_Request was poorly formatted (i.e., mandatory fields missing or if the the MSID was not available). |
| Message Authenticator | 0-1 | 0-1 | 0-1 | This is an optional TLV used to provide integrity protection for the messages. |

Proxy Mobile IP (PMIP) (e.g., PMIPv4 or PMIPv6) is used to facilitate a handoff in certain embodiments of the invention. For a Simple IP session, PMIP can be used for both the initial establishment as well as during an inter-PDSN handoff to setup one or more tunnels between the T-PDSN and the HA. For a MIP session, Client Mobile IP can be used at the initial establishment and Proxy Mobile IP can be used to setup one or more tunnels between the T-PDSN and the HA for a handoff. In some embodiments, the version of PMIP (v4 or v6) is independent of the application running or Client Mobile IP session that may be running.

Figure 24:
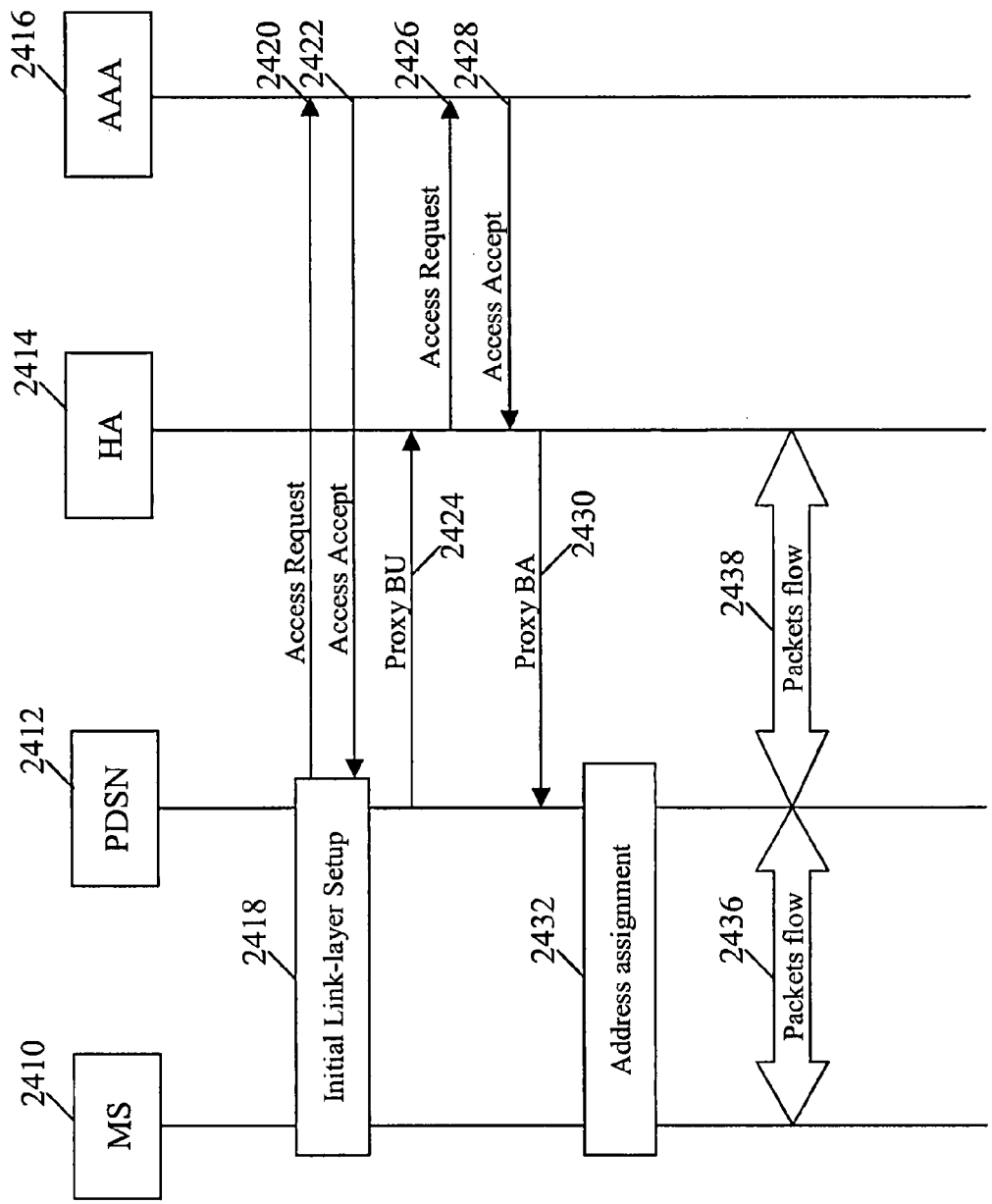
FIG. 24 is a signaling diagram of a PMIPv6 initial establishment for a clientless MS in accordance with certain embodiments of the invention.

FIG. 24 illustrates a PMIPv6 initial establishment for a clientless MS in accordance with certain embodiments of the invention. The network devices included are a mobile station (MS) 2410, a packet data serving node (PDSN) 2412, a Home Agent (HA) 2414, and an Authentication, Authorization, and Accounting (AAA) server 2416. The signaling illustrated in FIG. 24 describes how MS 2410 establishes a session with PDSN 2412 and HA 2414. In 2418, the initial serving PDSN 2412 performs link layer establishment with MS 2410, which can include link control protocol (LCP) and challenge-handshake authentication protocol (CHAP) for point-to-point protocol (PPP). For an IPv6 MS, IPv6CP can run to negotiate unique interface identifiers for MS 2410 and PDSN 2412. For a clientless IPv4 MS, an IPCP configure-NAK from PDSN 2412 is delayed. An access request message 2420 is sent by PDSN 2412 to check the CHAP response and indicates that PDSN 2412 is capable of PMIP operation. AAA 2416 returns an access accept message 2422 including PMS-HA-RK, a key used for proxy MS-HA authentication and an HA address for use during the session.

A proxy binding update (BU) 2424 is sent to the HA address. BU 2424 is authenticated through the MS-HA authentication option using the PDSN-specific key, PMS-HA, which is derived from the PMS-HA-RK key returned in access accept 2422. HA 2414 checks the authentication option extension by sending an access request 2426 to AAA 2416. AAA 2416 responds with an access accept 2428 and also returns the PMS-HA-RK, which is used to compute the PDSN-specific key, PMS-HA, and validate the key received in BU 2424. HA 2414 responds with a proxy binding acknowledgement 2430, which for an IPv6 session, includes an assigned home address option. For a clientless v4 session, this includes the assigned home IPv4 address option. PDSN 2412 generates a router advertisement in accordance with the attributes returned from the HA and MS 2410 uses stateless auto-configuration to generate an address for an IPv6 session. For a clientless MS, the address assignment during IPCP completes the process. In 2434 and 2436, packets can flow between MS 2410 and HA 2414 via PDSN 2412.

Figure 25:
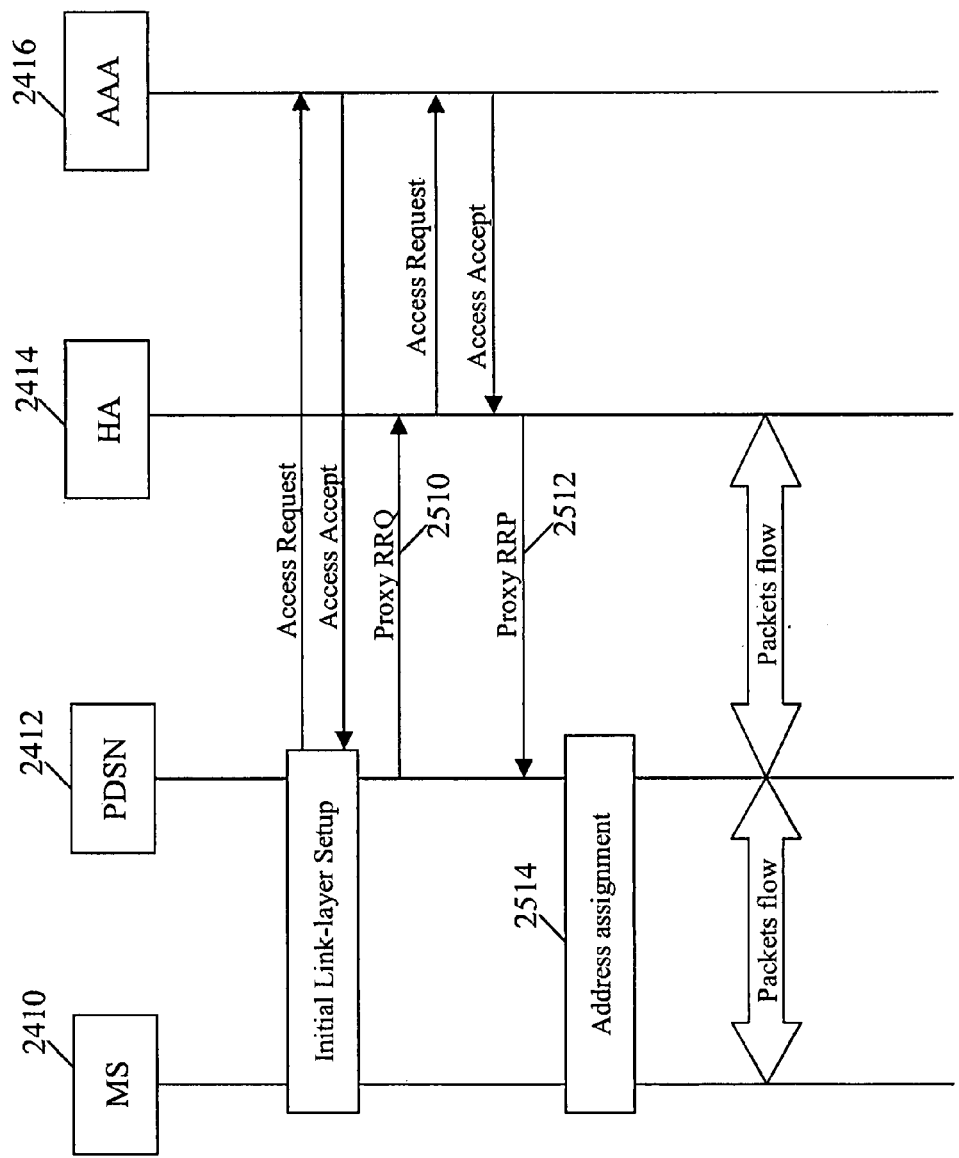
FIG. 25 a PMIPv4 initial establishment for a clientless MS in accordance with certain embodiments of the invention.

FIG. 25 illustrates a PMIPv4 initial establishment for a clientless MS in accordance with certain embodiments of the invention. Much of the signaling for PMIPv4 is similar to that explained above in FIG. 24, however, after PDSN 2412 receives the access accept message from AAA 2416, PDSN 2412 sends a proxy registration request (RRQ) 2510. Proxy RRQ 2510 is authenticated through the MS-HA authentication extension using the PDSN-specific key, PMS-HA, derived from the PMS-HA-RK key returned in the access accept message. Upon receiving the PMS-HA-RK from AAA 2416 to compute the PDSN-specific key, HA 2414 sends a proxy registration response (RRP) 2512 to PDSN 2412. For the PMIP session, proxy RRP 2512 includes an assigned home address option and for a clientless MS, this address is the MS IPv4 address. In 2514, an address is assigned to MS 2410 so packet data can begin flowing.

Figure 26:
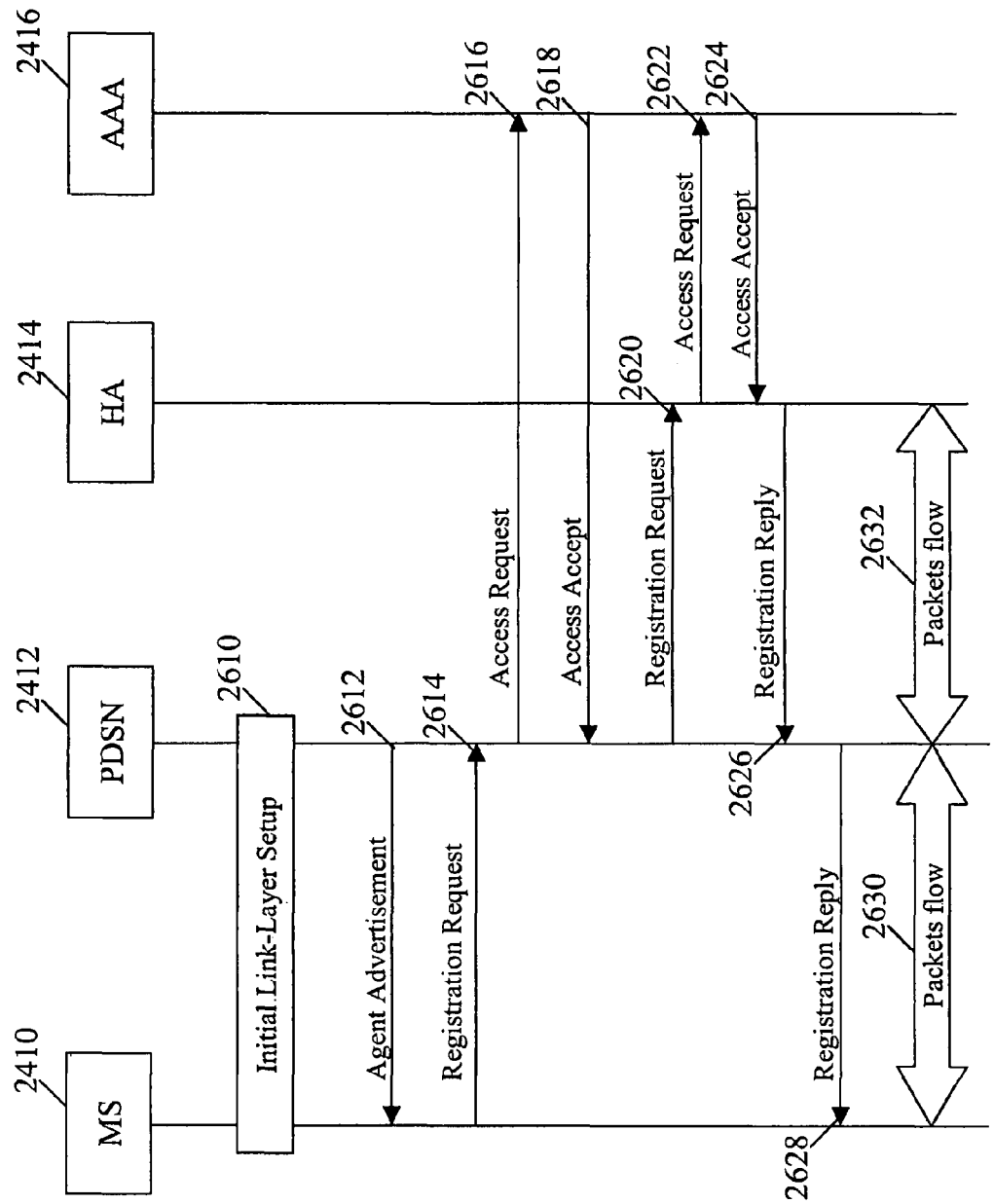
FIG. 26 initial establishment for client MIPv4 in accordance with certain embodiments of the invention.

FIG. 26 illustrates initial establishment for client MIPv4 in accordance with certain embodiments of the invention. The initial registration is client MIP, but subsequent binding updates or registration requests can be PMIP if the context transfer has completed. During the authentication phase, AAA 2416 returns a PMS-HA-RK key for use in subsequent handoffs. The PMS-HA-RK key is passed from PDSN to PDSN during context transfers in some embodiments of the invention. A PMS-HA key is derived from the PMS-HA-RK key using a pseudo-random function including the IP addresses of PDSN 2412 and HA 2414.

The initial establishment signaling begins with initial link-layer setup 2610. In 2610, LCP and IPCP are used to establish the link. In some embodiments, MS 2410 leaves the IP address option out of the IPCP configure request. PDSN 2412 sends an agent advertisement 2612 to MS 2410 including a challenge value. MS 2410 sends a registration request 2614 to PDSN 2412 to establish a session. PDSN 2412 authenticates the registration request with AAA 2416 with an access request message 2616. Access request message 2616 includes an indication that PDSN 2412 is PMIP capable. AAA 2416 returns an access accept message 2618 that includes a PMS-HA-RK key for use in subsequent binding updates and the address of HA 2414. PDSN 2412 propagates a registration request 2620 to HA 2414. HA 2414 checks a MS-HA PDSN specific key (and possibly a MS-AAA authentication extension (if chosen) with AAA 2416) and includes an indication that HA 2412 is PMIP capable in an access request message 2622. An access accept message 2624 is returned to HA 2414 along with MS-HA key for use in subsequent MIPv4 RRQs and a PMS-HA-RK key for use in subsequent PMIP messages. HA 2414 generates a registration reply message 2626 that is sent to PDSN 2412. The PDSN sends a registration reply 2628 to MS 2410. In 2630 and 2632, packet data can flow between HA 2414 and MS 2410.

In some embodiments, the tunnel between PDSN 2412 and HA 2414 is based on IP-in-IP tunneling. The outer IP header can be IPv6 or IPv4 depending on the version of PMIP and the inner IP header can be IPv6 or IPv4 depending on the type of service being invoked by MS 2410. Thus, some embodiments allow MS 2410 to request an IPv6 address and receive service over portions of an IPv4 network.

Figure 27:
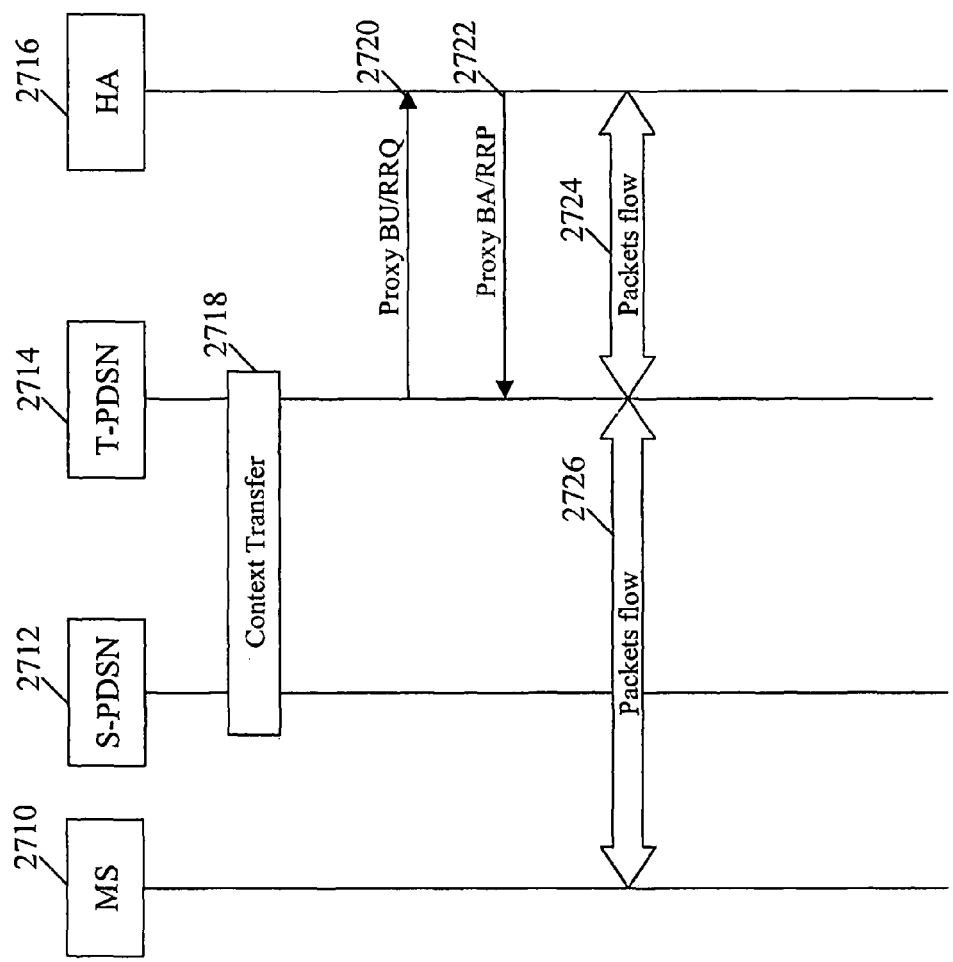
FIG. 27 a handoff using PMIPv6 or PMIPv4 in accordance with certain embodiments of the invention.

FIG. 27 illustrates a handoff using PMIPv6 or PMIPv4 in accordance with certain embodiments of the invention. The network devices involved in aspects of the signaling include mobile station (MS) 2710, Serving-PDSN (S-PDSN) 2712, Target-PDSN (T-PDSN) 2714, and home agent (HA) 2716. In 2718, T-PDSN 2714 performs a context transfer as described above. Information included in the context transfer are the address of HA 2716 and the PMS-HA-RK key (in mobility and security contexts) for use in constructing the binding update (PMIPv6) or the registration request (PMIPv4). T-PDSN 2714 computes a PMS-HA key using prf(PMS-HA-RK, PDSN IP address, HA IP address). T-PDSN 2714 sends a proxy binding update/registration request 2720 to HA 2716 (the address received in 2718). The binding update/registration request 2720 is authenticated using the PMS-HA security association between T-PDSN 2714 and HA 2716. HA 2716 responds with a proxy binding acknowledgement/registration response 2722 and the information received is used to initiate a tunnel switchover. Packets 2724 and 2726 then flow from MS210 to HA 2716 through T-PDSN 2714.

In some embodiments, software needed for implementing a process includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. In some embodiments, an access gateway, a packet data serving node (PDSN), a foreign agent (FA), or home agent (HA) can be implemented on a Starent Networks, Corp. of Tewksbury, Mass. ST16 Intelligent Mobile Gateway (IMG). Other types of devices can also be used in other embodiments to provide handoffs using the above-described method and protocol such as a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF).

In certain embodiments, one or more of the above-mentioned other types of devices are integrated together or provided by the same device. For example, an access network can be integrated with a PDSN and the fast handoff interface can be between access networks. The generic protocol message format including usage specific TLVs can be used with any gateway or access network. A gateway can include a PDSN, a FA, a HA, a GGSN, a PDIF, an ASNGW, a UPE, an IP Gateway, an access gateway, or any other applicable access interface device. In certain embodiments, a ST16 IMG can implement a gateway.

In some embodiments, a ST16 IMG can be used to provide a fast handoff interface between devices. The ST16 IMG can implement many types of logical or functional devices such as a PDSN, GGSN, PDIF, ASNGW, FA, and HA. The ST16 IMG includes slots for loading application cards and line cards. A midplane can be used in the ST16 IMG to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the ST16 IMG implemented by establishing inter-card communications between application cards and line cards. The control bus interconnects the control and management processors within the ST16 IMG. The ST16 IMG management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The ST16 IMG supports at least two types of application cards: a switch processor card and a packet accelerator card. The switch processor card serves as a controller of the ST16 IMG and is responsible for such things as initializing the ST16 IMG and loading software configurations onto other cards in the ST16 IMG. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the ST16 IMG provide input/output connectivity and can also provide redundancy connections as well.

The operating system software can be based on a Linux software kernel and run specific applications in the ST16 IMG such as monitoring tasks and providing protocol stacks. The software allows ST16 IMG resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The ST16 IMG's software can be divided into a series of tasks that perform specific functions. These tasks communicate with each other as needed to share control and data information throughout the ST16 IMG. A task is a software process that performs a specific function related to system control or session processing. Three types of tasks operate within the ST16 IMG in some embodiments: critical tasks, controller tasks, and manager tasks. The critical tasks control functions that relate to the ST16 IMG's ability to process calls such as ST16 IMG initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on an ST16 IMG include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the ST16 IMG by monitoring the various software and hardware components of the ST16 IMG. Recovery control task subsystem is responsible for executing a recovery action for failures that occur in the ST16 IMG and receives recovery actions from the high availability task subsystem. Shared configuration task subsystem provides the ST16 IMG with an ability to set, retrieve, and receive notification of ST16 IMG configuration parameter changes and is responsible for storing configuration data for the applications running within the ST16 IMG. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the ST16 IMG, which include creating separate VPN contexts, starting IP services within a VPN context, managing IP pools and subscriber IP addresses, and distributing the IP flow information within a VPN context. In some embodiments, within the ST16 IMG, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A wireless communication system for communication with a mobile node and with a home agent providing mobility services for the mobile node, comprising:
   a serving gateway for communication with the mobile node; and
   a target gateway for communication with the mobile node, the target gateway for
      receiving a registration request from the mobile node and
      communicating a handoff request to the serving gateway including a request for a plurality of context identifiers, the context identifiers identifying a plurality of contexts to be handed off from the serving gateway to the target gateway for the mobile node;
   the serving gateway, responsive to the registration request, for
      communicating context information for the contexts identified by the plurality of context identifiers to the target gateway in a context transfer message, the context transfer message including a function type parameter that supports at least a handoff function type, a message type parameter that supports a plurality of message types for each function type, and a usage-specific parameter that supports a plurality of data parameters encoded in a type length value (TLV) format, and
   the target gateway further being for
      initializing the contexts at the target gateway using the requested context information,
      sending a handoff acknowledgement message to the serving gateway,
      processing packets after a handoff context has been initialized, and
      sending an acknowledgement message to the home agent after the one or more handoff contexts has been initialized, the acknowledgement message for causing the home agent to communicate with the mobile node via the target gateway rather than the serving gateway for communications directed to the mobile node,
   the context transfer message thus facilitating a handoff by synchronizing context information between the target gateway and the serving gateway.

2. The system of claim 1, wherein the target gateway communicates with the home agent using Proxy Mobile Internet Protocol (PMIP).

3. The system of claim 1, wherein the target gateway includes at least one of a packet data serving node (PDSN), a packet data inter-working function (PDIF), and an Access Service Network Gateway (ASNGW), and wherein the context information is formatted as a context transfer normal vendor-specific extension.

4. The system of claim 1, further comprising the serving gateway and the target gateway integrated with at least one of a radio access network, a base station, and an access network.

5. The system of claim 1, the plurality of message types further comprising a handoff request type, a handoff response type, and a handoff acknowledgement type, and the plurality of data parameters further comprising at least a generic routing encapsulation (GRE) key, a user identifier, a mobility state, and an authorization state.

6. The system of claim 1, wherein the target gateway is operable to form a generic routing encapsulation (GRE) tunnel between the target gateway and the serving gateway mapped to an A10 connection.

7. A method for communication with a mobile node comprising:
   receiving a serving gateway address at a target gateway;
   sending a handoff request including a request for context transfer information encoded in a type-length-value (TLV) format from the target gateway to the serving gateway, the request for context transfer information identifying a plurality of contexts to be handed off from the serving gateway to the target gateway for the mobile node;
   receiving, from the serving gateway, context transfer information for contexts identified by the request for context transfer information in a context transfer message, the context transfer message including a function type parameter that supports at least a handoff function type, a message type parameter that supports a plurality of message types for each function type, and a usage-specific parameter that supports a plurality of data parameters encoded in a type length value (TLV) format;
   initializing a handoff context at the target gateway based on the context transfer information received in the context transfer message; and
   receiving data packets directly from the serving gateway prior to sending a message to communicate with the mobile node via the target gateway rather than the serving gateway, and before the handoff context is initialized,
   thus facilitating a handoff by synchronizing context information using the context transfer message between the target gateway and the serving gateway.

8. The method of claim 7, further comprising communicating between the target gateway and a home agent using Proxy Mobile Internet Protocol (PMIP).

9. The method of claim 7, further comprising providing a generic protocol message format including usage specific TLVs for communicating context transfer information.

10. The method of claim 7, wherein the context transfer information includes at least one of a generic routing encapsulation (GRE) key, a User ID, an Internet Protocol Control Protocol (IPCP) state, a Proxy Mobile Internet Protocol (PMIP) v6 Mobility state, and a quality of service (QoS) state, and wherein the context transfer information includes session information.

11. The method of claim 7, further comprising switching packet processing from the serving gateway to the target gateway after the handoff context is initialized using the context transfer information.

12. The method of claim 7, further comprising providing one or more generic routing encapsulation (GRE) tunnels between the target gateway and the serving gateway mapped to A10 connections.

13. The method of claim 12, further comprising the context transfer information including a GRE key for each A10 connection.

14. The method of claim 7, further comprising maintaining a session for a mobile station through a fast handoff (FHO) interface.

15. The method of claim 7, further comprising setting up a fast handoff (FHO) tunnel using the context transfer information.

16. The method of claim 15, wherein fast handoff (FHO) tunnel setup and context transfer occur in parallel.

17. The method of claim 7, further comprising the serving gateway forwarding unprocessed packets to the target gateway via the GRE tunnel.

18. A wireless communication system for communication with a mobile node comprising:
   a serving access network;
   a target access network in communication with the serving access network, and operable to communicate a handoff request to the serving access network, the handoff request including a request for context transfer information for a plurality of contexts to be handed off from the serving access network to the target access network for the mobile node, the information encoded in a type-length-value (TLV) format;
   the serving access network for communicating to the target access network a handoff response including the requested context transfer information and for processing packets for a packet flow directly between the serving access network and the target access network prior to the target network sending a message to communicate with the mobile node via the target gateway rather than the serving gateway, and before a handoff context is installed; and
   the target access network for installing the handoff context using context transfer information received from the serving access network in a context transfer message, the context transfer message including a function type parameter that supports at least a handoff function type, a message type parameter that supports a plurality of message types for each function type, and a usage-specific parameter that supports a plurality of data parameters encoded in a type length value (TLV) format, and for forwarding packets to the mobile node, and for sending a handoff acknowledgement message to the serving access network after the handoff context has been installed.

19. The system of claim 18, wherein the target access network is integrated with at least one of a packet data serving node (PDSN), a packet data inter-working function (PDIF), a gateway GPRS service node (GGSN), an access gateway, an IP gateway, and an Access Service Network Gateway (AS-NGW).

20. A wireless communication system for communication with mobile users comprising:
   target means for providing communication to and from a mobile station and for communicating a handoff request to a serving means, the handoff request including a request for context transfer information for a plurality of contexts to be handed off from the serving access network to the target access network encoded in a type length value (TLV) format, the request for context transfer information including a function type parameter that supports at least a handoff function, a message type parameter supporting a plurality of message types, and a usage-specific parameter that encodes a plurality of data parameters in a TLV format;
   the target means for receiving a handoff response including the requested context transfer information from the serving means, and for communicating with a direct packet flow with the serving means;
   the target means for installing contexts based on the requested context transfer information received from the serving means and for forwarding packets to the mobile station received directly from the serving means, prior to sending a message to communicate with the mobile node via the target means rather than the serving means, by sending the packets to the mobile station,
   the target means for sending a handoff acknowledgement message to the serving means after the contexts have been installed; and
   the target means for sending a handoff completion message to a home agent, the home agent operable to switch communication to the target means in response to the handoff completion message, the home agent providing mobility services for the mobile station.

* * * * *